United States Patent
Kamijo et al.

(10) Patent No.: US 8,035,861 B2
(45) Date of Patent: Oct. 11, 2011

(54) METHOD AND SYSTEM FOR OBTAINING PARAMETER FOR SIMULATION IN INVISIBLE CODE PRINTING SUPPORT SYSTEM

(75) Inventors: Noboru Kamijo, Fujisawa (JP); Kohichi Kamijoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 11/963,635

(22) Filed: Dec. 21, 2007

(65) Prior Publication Data

US 2008/0151280 A1 Jun. 26, 2008

(30) Foreign Application Priority Data

Dec. 21, 2006 (JP) ................... 2006-344688

(51) Int. Cl.
*H04N 1/40* (2006.01)
(52) U.S. Cl. ........................ 358/3.28; 358/468
(58) Field of Classification Search ............... 358/1.9, 358/2.1, 3.28, 3.01, 468; 283/109–114; 347/107
See application file for complete search history.

(56) References Cited

U.S. PATENT DOCUMENTS 5,259,907 A * 11/1993 Soules et al. ................. 156/277
5,502,304 A    3/1996 Berson et al.

FOREIGN PATENT DOCUMENTS

| EP | 0997837 | 5/2003 |
| JP | 11286149 A | 10/1999 |
| JP | 2000-127515 | 5/2000 |
| JP | 2001188870 | 7/2001 |
| JP | 2002133194 A | 5/2002 |
| JP | 2002-165078 | 6/2002 |
| JP | 2002165078 | 6/2002 |
| JP | 2003058824 | 2/2003 |
| JP | 2005-195338 | 7/2005 |
| JP | 2006-229894 | 8/2006 |
| WO | WO 95/13597 | * 5/1995 |

OTHER PUBLICATIONS

EPO Search Report for Patent Application No. 07851001.3, pp. 1-6 (Mar. 15, 2010).
International Search Report for International Patent Application PCT/JP2007/074576, pp. 1-2 (Apr. 1, 2008).

* cited by examiner

*Primary Examiner* — Thomas D Lee
*Assistant Examiner* — Stephen M Brinich
(74) *Attorney, Agent, or Firm* — Ido Tuchman; William J. Stock

(57) ABSTRACT

An image of a sample print printed to obtain parameters is picked up by using "a parameter obtaining device" that meets the standards of an instrument for the invention of "the electronic scrap system." Then, the picked-up image is captured by a DTP system, and color data of a needed position are imported to a parameter DB. Thereby, parameters for simulation to be used in an invisible code printing support system can be easily inputted. Use of this method eliminates the necessity of figuring out parameters through experiments and the like, and of inputting these parameters as numerical values. In addition, since this method uses a physical medium and inks to be actually used, as they are, their optical characteristics, an influence of a blue component of invisible light emitted from an ultraviolet LED, and the like can be inputted all together as a picked-up image. Accordingly, it becomes possible to input parameters capable of accurately reproducing actual printed conditions, and thereby to produce printed materials providing high reading accuracy.

18 Claims, 17 Drawing Sheets

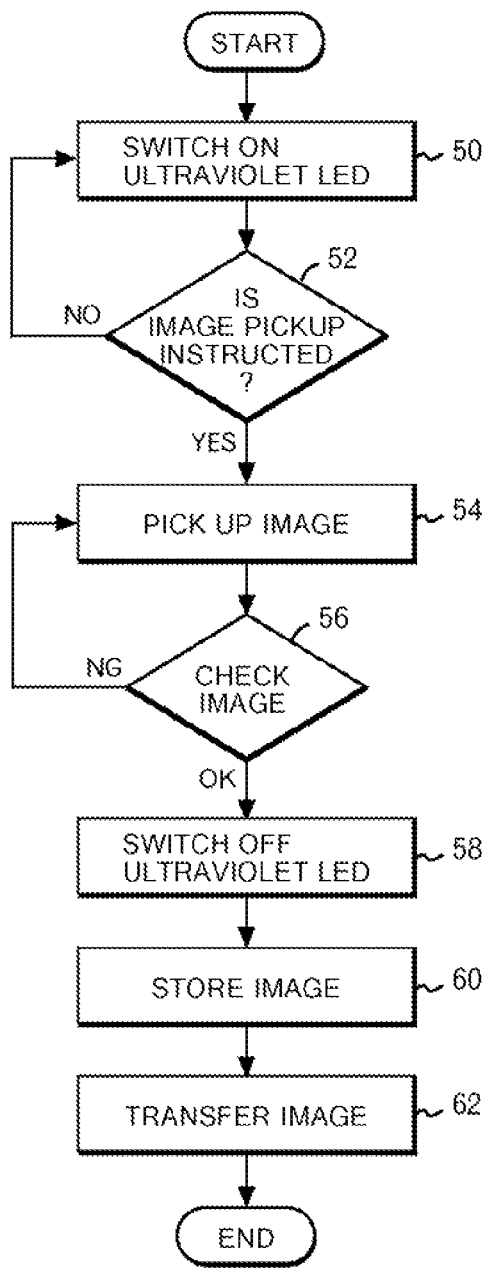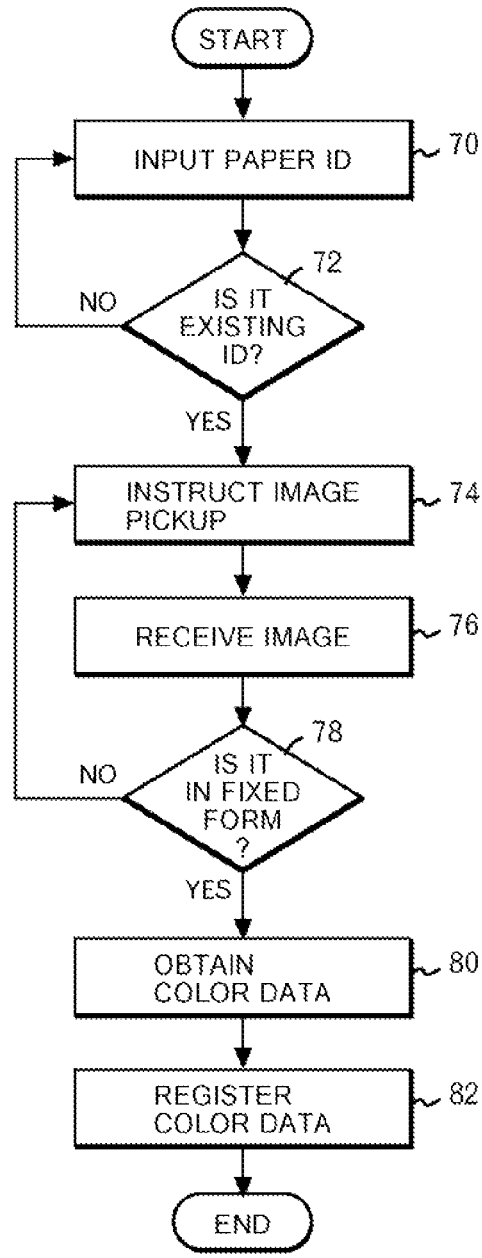
FIG. 3
FIG. 4

METHOD AND SYSTEM FOR OBTAINING PARAMETER FOR SIMULATION IN INVISIBLE CODE PRINTING SUPPORT SYSTEM

CROSS-REFERENCE TO RELATED APPLICATIONS

This application claims priority under 35 U.S.C. §119 to Japanese Patent Application No. 2006-344688 filed Dec. 21, 2006, the entire text of which is specifically incorporated by reference herein.

BACKGROUND OF THE INVENTION

The present invention generally relates to an information processing technique, and more specifically relates to a technique for improving accuracy in reading invisible information printed together with visible information on a medium such as paper.

With wide spread of an editing and publishing method for newspapers and magazines by using a computer, such as desk top publishing (DTP), there has been built business for providing PCs, PDAs, dedicated instruments and mobile phones via the Internet with pay contents stored in servers as digitalized original contents of articles and photos printed in the newspapers and magazines.

However, paper is still used as a main medium because of its information volume and convenience. For this reason, people in publishing business desire to utilize unused data stored in servers for business by combining paper media and digital contents in some way.

Japanese Patent Application Laid-open Publication No. 2006-229894 (the laid-open date is 31 Aug. 2006) discloses an "ELECTRONIC SCRAP SYSTEM" invented as a method for combining digital contents with printed materials of physical media such as paper, plastics and cloths. In this system, information related to the content of a conventional printed material is additionally printed as a usually-invisible two-dimensional barcode on the conventional printed material, with a transparent stealth ink (that is an invisible ink fluorescing by reacting to usually-invisible light, for example, ultraviolet rays or infrared rays, or absorbing these kinds of light). Then, in this system, this information and its related information are displayed and used together with the usual visible image by using a mobile phone equipped with a digital camera supporting the electric scrap system. The application discloses the basic method for providing various services by combining this information with original digital contents stored in a server.

With this method, a hybrid book giving a new added value to a usual printed material can be published by embedding invisible information on any place in texts, photos, illustrations and the like without taking care of an appearance and layout of visible information on the printed material.

When stealth information is printed on a printed material, the stealth information can be read without any problem on a good condition like a case where background visible information is uniform. However, when an invisible two-dimensional barcode is laid out on printed texts, a photo or illustration, the background inevitably makes an adverse affect on reading performance of the two-dimensional barcode. As a result, in an extreme case, the condition of a place where the barcode is laid out is so bad that the barcode cannot be read at all. In addition, in some cases, it may be necessary to take into consideration conditions of a printing medium, such as quality of paper and stain, and conditions of reading the printing medium, such as a case where the printing medium is folded and a place where the printing medium is read. For example, since printing media such as a newspaper are generally folded into two or four, it is preferable to lay out invisible information away from a place which is highly likely to be folded as mentioned above.

As an attempt for solving such problems, Japanese Patent Application No. 2005-195338 (International Patent Application No. PCT/JP2006/313058) provides the invention, "INVISIBLE CODE PRINTING SUPPORT SYSTEM." This system aims to achieve a reading rate of 100% in a logical manner. Specifically, in order to lay out an invisible two-dimensional barcode for "the electronic scrap system" on a printed material, a DTP system in this system makes a simulation using an invisible barcode extraction algorithm, when the layout of the printed material is composed, for example. The DTP system carries out the simulation while checking whether or not a combination of background information and the invisible information to be laid out is appropriate for reading performance of an instrument supporting "the electronic scrap system. Thereby, the DTP system specifies or optimizes the color, the position, the size and the like of the invisible information to be laid out.

Use of this system not only makes it easier to create a printed material providing higher reading accuracy to the electronic scrap system. But also, when printed materials are produced, the use makes it possible to fully ensure that all the printed materials can provide such a function, not by performing 100% inspection but only by performing random inspection.

Here, in order to enhance reading accuracy, it is important to input, as parameters for simulation, closest possible values to actual conditions. Examples of the parameters include data on characteristics of inks and paper to be used for printing background and an invisible barcode, and data on an environment at a time when an instrument supporting the electronic scrap system extracts the invisible barcode. However, as for the invisible code printing support system (Japanese Patent Application No. 2005-195338, International Patent Application No. PCT/JP2006/313058), a specific method for finding values for parameters is not presented.

BRIEF SUMMARY OF THE INVENTION

An object of the present invention is to provide a specific method for inputting to a system, closest possible values to those under actual conditions, as parameters for simulating environmental data and the like at an extraction time, for the purpose of improving accuracy in reading invisible information. This object is achieved by inputting these parameters by using color data on a visible ink, an invisible ink and a physical medium to be used to actually print a background and an invisible barcode.

The present invention relates to a method for easily carrying out such parameter input, and a system for the method. The method and system makes it possible to easily input parameters for simulation to be used in an invisible code printing support system in the following way. First, an image of a sample print printed to obtain parameters is picked up by using "a parameter obtaining device" that meets the standards of an instrument for the invention of "the electronic scrap system." Then, the picked-up image is captured by a DTP system, and color data of a needed position are imported to a parameter DB.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

FIG. 3 is a flow chart showing an operation of the parameter obtaining device and the obtaining of color data in the DTP system according to the embodiment of the present invention.

FIG. 4 is a flow chart showing an operation of obtaining color data by a color data management function of the electronic scrap system according to the embodiment of the present invention.

FIG. 13 is an image example of a page produced by a printing apparatus according to the embodiment of the present invention.

FIG. 14 is an image example of a page produced by the printing apparatus according to the embodiment of the present invention.

DETAILED DESCRIPTION OF THE INVENTION

FIGS. 1A and 1B show diagrams of an image of a method for obtaining parameters containing a sample print.

Figure 1:
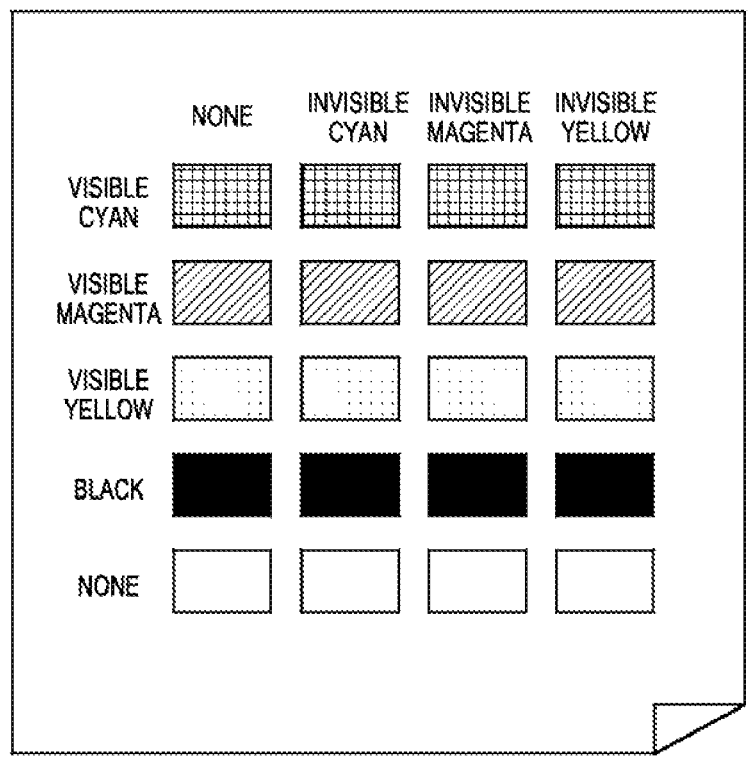
FIG. 1 is a diagram showing an image of a method for obtaining parameters including a sample print according to an embodiment of the present invention.
Figure 1:
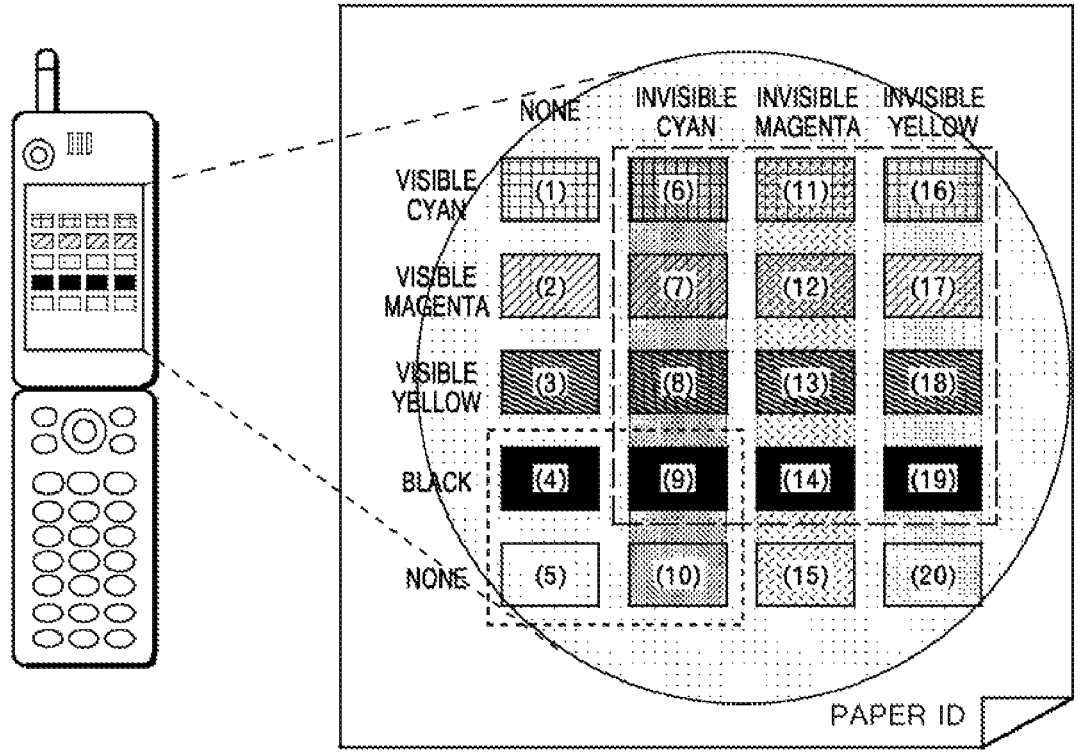
Figure 2:
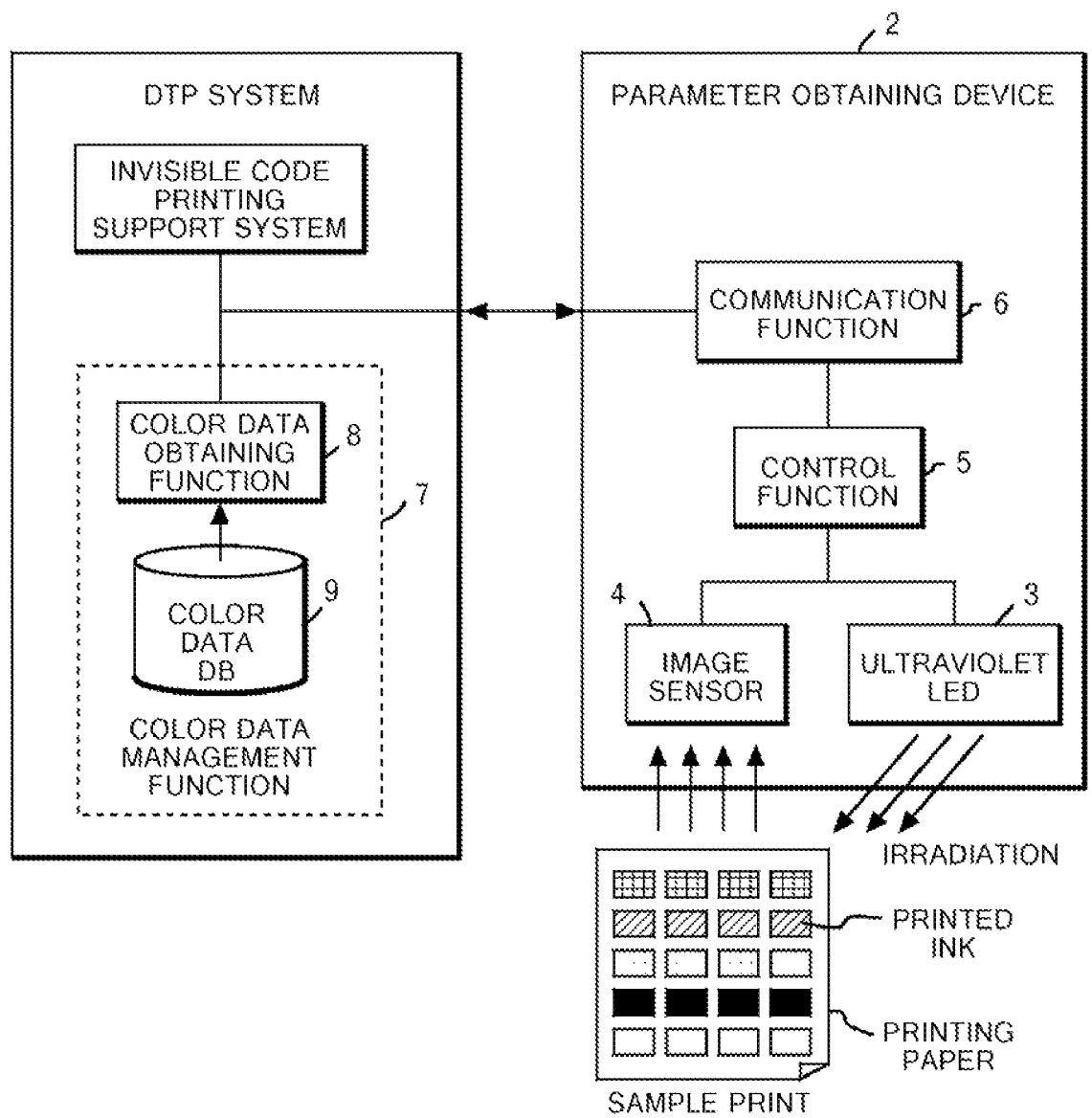
FIG. 2 shows configuration diagrams of a parameter obtaining device and an electronic scrap system achieving the method shown in FIG. 1 according to the embodiment of the present invention.

FIG. 2 shows configuration diagrams of a parameter obtaining device and an electronic scrap system for implementing the method shown in FIG. 1.

"The electronic scrap system" extracts an image of a two-dimensional barcode from a background image of a taken photograph by using color data of the printed two-dimensional barcode. For this reason, it is necessary to input, as simulation parameters to "the invisible code printing support system," correct color data at a time when an invisible two-dimensional barcode to be printed is excited to emit light by a light emitting device (for example, an ultraviolet LED).

For example, since usual printing basically uses visible inks of four colors of cyan, magenta, yellow and black, color data of stealth inks overprinted on these printed visible inks are also important parameters. In addition, basic stealth inks are also of three colors of cyan, magenta and yellow. Accordingly, necessary combinations are 4 lines×3 columns of combinations ((6) to (9), (11) to (14) and (16) to (19)) enclosed by a dashed line on the upper right side of a sample print shown in FIG. 1B. Here, FIG. 1B shows an image of the colors of stealth inks including a state in which the stealth inks emit light under irradiation of an ultraviolet LED. A circled part shows, as images of the stealth inks irradiated with ultraviolet rays, images of light emitting states of a part corresponding to (6) to (10), light emitting states of a part corresponding to (11) to (15) and light emitting states of a part corresponding to (16) to (20) with different dark and light patterns provided to the respective parts. On the other hand, FIG. 1A shows how a sample print is viewed in a usual case without irradiation of the ultraviolet LED.

The peak wavelength of an ultraviolet LED generally contains most of light components. An LED having a wavelength of 365 to 375 nm which is used for the electronic scrap system inevitably also emits light components with wavelength longer than 400 nm, the light components observed as blue with the naked eyes. For this reason, the color of an irradiated part typically looks bluish. In addition, a fluorescence agent is used for certain kinds of paper to make the paper look white. When such a sheet of paper is irradiated by the LED, the paper may emit bluish light. For this reason, in order to obtain correct information on these influences, it is necessary to prepare, as minimum parameters, color data on 5 lines×4 columns of combinations obtained by adding the combinations (1), (2), (3), (4) and (5) having no stealth ink printed and the combinations (5), (10), (15) and (20) having no usual ink printed, to the combinations enclosed by the dashed line on the upper right side of the FIG. 1B.

To make a sample print for parameter input as shown in FIG. 1, 5 lines×4 columns of combinations are printed with inks to be actually used, on a paper sheet to be used as a printed material. In other words, in a sample print, invisible information to be extracted by an apparatus having an image pickup function and visible information are printed on a physical medium (paper in the embodiment). In addition, such a sample print needs to have at least four patterns which can be distinctly extracted as different patterns, which are the following patterns of: (1) a physical medium itself; (2) at least one color of visible ink printed on the physical medium; (3) at least one color of invisible ink printed on the physical medium; and (4) the invisible ink overprinted on the visible ink printed on the physical medium. At this time, it is desirable that a sample print be made with a printing apparatus to be actually used, by using the same printing parameters such as the thickness of printed ink as those to be used to finally print the materials. In this way, accuracy in simulation is improved.

Among at least four patterns described above, as for the pattern of (1) a physical medium itself, there is a case where a part of a printing medium is covered with a transparent coating agent having a characteristic of allowing visible light and invisible light to pass there through without reacting to them. In other words, the expression of the pattern (1) not using "the surface" but using "itself" is intended to express that the pattern (1) does not indicate the surface of the transparent coating agent in the above case.

In addition, among at least four patterns described above, the pattern (4) of the invisible ink overprinted on the visible ink printed on the physical medium needs to be taken into particular consideration in some cases. Since rotary press printing typified by printing for newspapers is contact type printing, a phenomenon may occur in which a black visible ink used as a main color, in particular, is gradually mixed with an invisible ink. The influence of such a phenomenon can be alleviated by carefully laying out an invisible pattern in a position less recognizable by the human eye even if such a phenomenon occurs, that is, a less recognizable text or photo whose background is not of complete white, but of dark color Moreover, some types of invisible ink have a characteristic that the invisible ink gradually loses emission intensity over time while being irradiated with ultraviolet rays. For this reason, it is preferable to arrange an invisible pattern by estimating such a change over time in advance. Even when the emission intensity is reduced, arranging the pattern in an appropriate position avoids a problem in reading performance.

Parameters are provided to the DTP system shown in FIG. 2 by using a method in which the parameter obtaining device 2 picks up an image of a sample print irradiated by the ultraviolet LED, and then transfers the image to the DTP system. This parameter obtaining device meets the standards of an instrument supporting the electronic scrap system, and includes an image sensor 4 and an ultraviolet LED 3 that have the same characteristics as those of the instrument supporting the electronic scrap system. With this configuration, the same conditions are created as in the case where a user actually picks up an image of a printed material for an electronic clip with an instrument for the electronic scrap system.

FIG. 2 shows configuration diagrams of these systems. The parameter obtaining device 2 includes the image sensor 4 formed of a CCD or CMOS, and the ultraviolet LED 3 for exciting a stealth ink (invisible ink) and thereby for causing the stealth ink to fluoresce. The LED 3 and the image sensor 4 pick up an image of a sample print while an electric current at a predetermined voltage is applied to the ultraviolet LED 3 under control of a control function 5 in the parameter obtaining device 2. An image can be picked up in synchronization or out of synchronization with an instruction from the DTP system 12. In the case of the image-pickup out of synchronization, picking up an image can be triggered by pressing a shutter release button and the like of the parameter obtaining device 2. The picked-up image of the sample print is transferred to a color data management function 7 in the DTP system via communications or a removable medium such as a USB memory.

In the color data management function 7, the image data of this sample print are temporarily stored in a color data base (DB) 9, first. Then, the color data obtaining function 8 reads color data of 20 portions of 5×4 combinations of the sample print as shown in FIG. 1, and the color data are stored in the color data base (DB) 9 together with a printing paper ID. Since the patterns in this sample print are arranged in positions predetermined by color in an array as a fixed form, the color data obtaining function 8 can automatically obtain the color data of 20 portions corresponding to the patterns. It is possible to employ any of various fixed forms for the patterns such as a one-dimensional array, a two-dimensional array, a three-dimensional array and the like as long as the patterns are arranged in such a form that the color data can be distinctly extracted as different patterns. In this regard, FIG. 1B merely shows a two-dimensional array. The color data may be obtained distinctly from the respective portions in the order of (1), (2), (3), (4), (5), (6), (7) . . . (19) and (20), or may be obtained distinctly from the respective portions in the order of (1), (6), (11), (16), (2), (7), (12) . . . (15) and (20). Those skilled in the art should be able to find out various different methods as such a scanning method for obtaining data. The invisible code printing support system reads color data needed for simulation from the color data base 9 in response to the designation of a printing paper ID (which printing paper to be used, or which physical medium to be used), and then utilizes the color data.

FIG. 3 is a flow chart showing an operation of the parameter obtaining device and the obtaining of color data. In step 50, the ultraviolet LED is switched on, and a sample print is irradiated with invisible light, thereby becoming in an irradiated state. Even when the ultraviolet LED stops to emit the invisible light, a state in which the sample print emits sufficient afterglow of the light can be called "an irradiated state," of course. In step 52, an instruction on whether or not to pick up an image is issued. If it is instructed to pick up the image, the image is picked up in step 54. In step 56, a judgment is made as to whether or not the picked-up image is appropriate. If the picked-up image is not appropriate, another image is picked up. In step 58, the ultraviolet LED is switched off. The picked-up image is stored in step 60, and then the stored image is transferred in step 62.

FIG. 4 is a flow chart showing an operation in which the color data management function of the electronic scrap system obtains color data. In step 70, the color data management function receives an input of a paper ID. In step 72, a judgment is made as to whether the inputted paper ID (which printing paper to be used) is one of existing paper IDs. If it is not an existing paper ID, a prompt to input another paper ID is issued. In step 74, an instruction on whether or not to pick up an image is issued. Then, the image is received in step 76. Next, a judgment is made as to whether or not the image is matched with a fixed form (whether or not the patterns in the sample print follow predetermined patterns) in step 78. After that, the color data are obtained in step 80, and the color data are registered in step 82.

Figure 5:
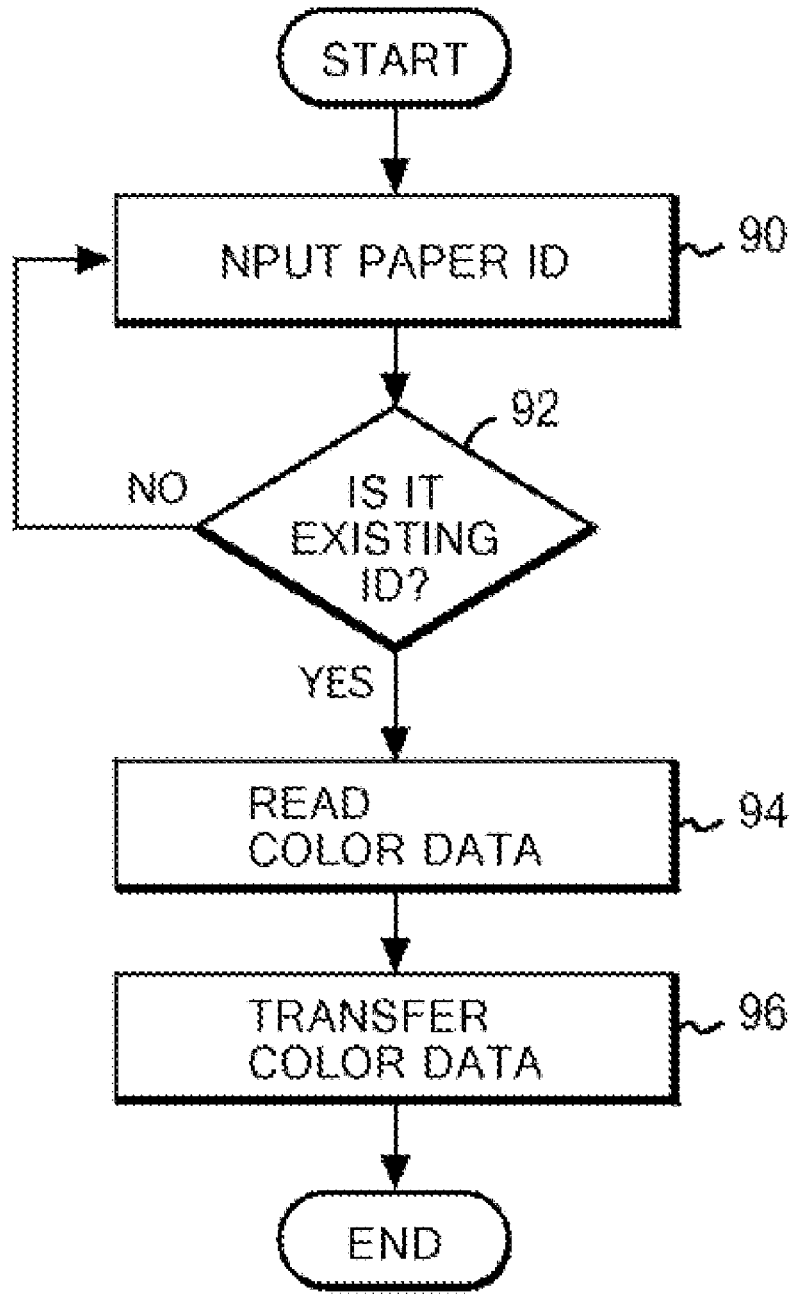
FIG. 5 is a flow chart showing an operation of providing color data by a color data management function of the electronic scrap system according to the embodiment of the present invention.

FIG. 5 is a flow chart showing an operation in which the color data management function of the electronic scrap system provides color data. In step 90, the color data management function receives an input of a paper ID. In step 92, a judgment is made as to whether the inputted paper ID (which printing paper to be used) is one of existing paper IDs. If it is not an existing paper ID, a prompt to input another paper ID is issued. The color data is read in step 94, and then transferred in step 96.

Figures 13, 14:
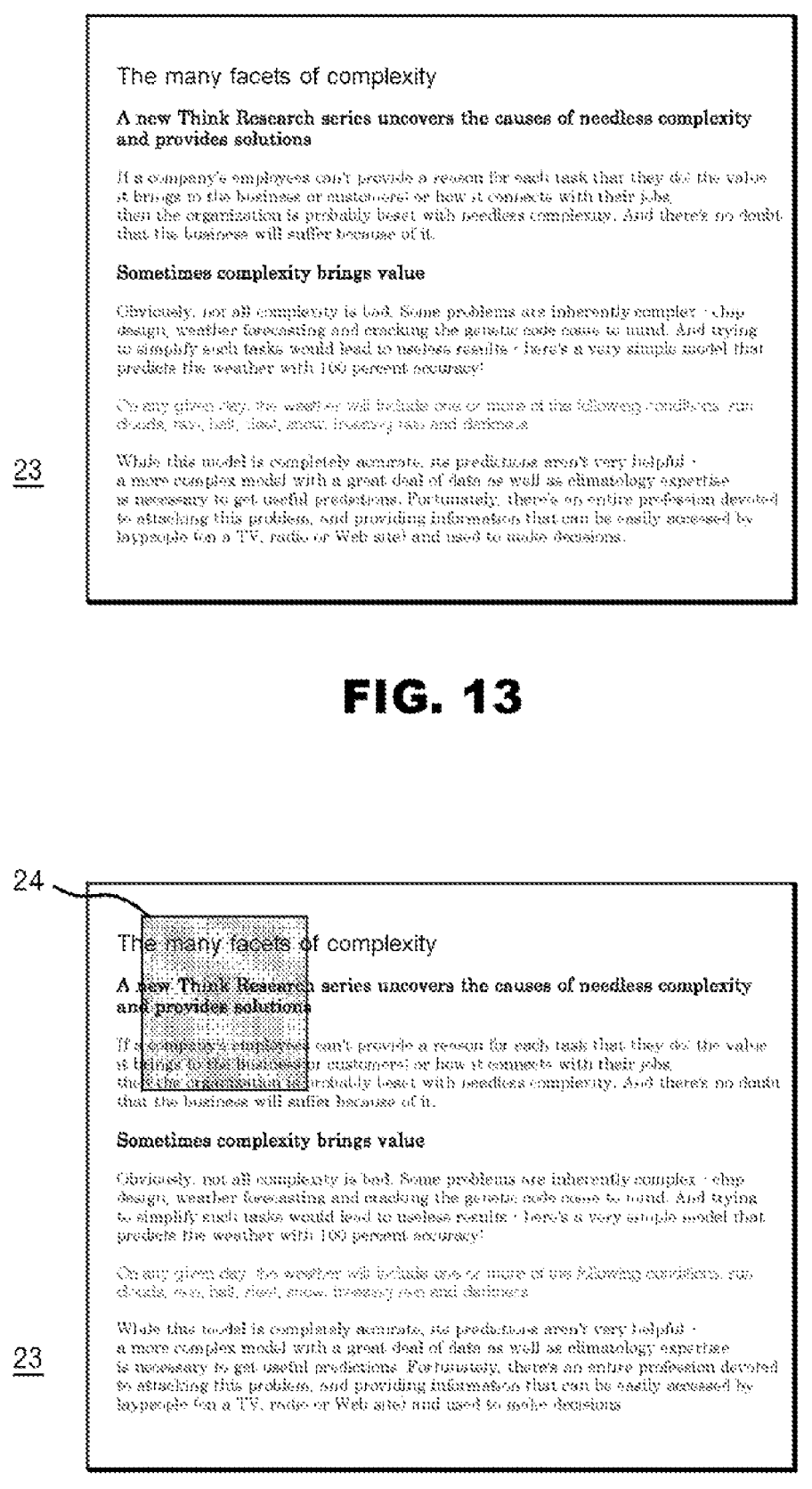

As an example, FIG. 14 shows a simulation screen in a case where the invisible code printing support system of the DTP system lays out an invisible two-dimensional barcode 24 on a black and white newspaper 23 printed with a single color. In this case, since the newspaper 23 is black and white, a single color stealth ink is used to print the invisible information. In order to obtain parameters for simulation, the invisible code printing support system transmits a printing paper ID to the color data management function, and obtains the color data corresponding to the printing paper ID. Reference numerals (1) to (20) in FIG. 1B indicate correspondence between patterns in a sample print and 20 pieces of color data stored in the color data base in association with a paper ID.

The black and white newspaper requires only 4 kinds of color data for layout simulation of the two-dimensional barcode. To be more precise, the 4 kinds of color data are located in a portion surrounded by a dotted line on the lower left side of FIG. 1B, and includes: (4) a black color irradiated by the ultraviolet LED; (5) a paper color irradiated by the ultraviolet LED; (9) a color obtained by causing the invisible cyan ink overprinted on the black ink to emit light by use of the ultraviolet LED; and (10) a color obtained by causing the invisible cyan ink printed on the paper to emit light by use of the ultraviolet LED. The invisible code printing support system makes a simulation using these 4 kinds of color data out of the 20 color data received from the color data management function, and lays out a two-dimensional barcode appropriate in size in an appropriate position near a position where the two-dimensional barcode is currently laid out.

In this way, use of the present invention makes it possible to easily input parameters for simulation used in the invisible code printing support system. Hereinafter, the simulation by the invisible code printing support system will be described.

Figure 6:
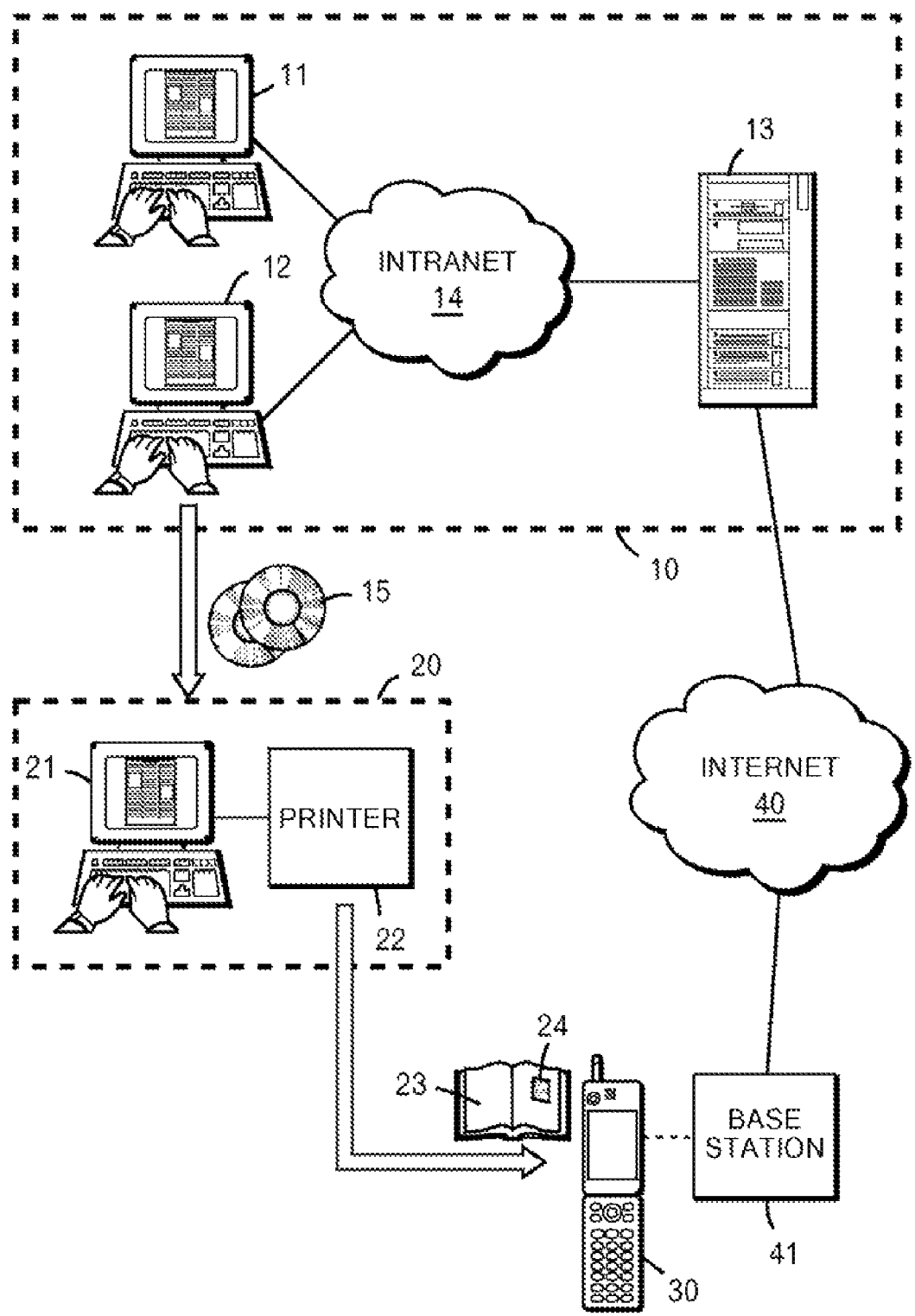
FIG. 6 is a high level conceptual diagram of the embodiment of the present invention.

FIG. 6 is a high level conceptual diagram of an embodiment of the present invention. The embodiment of this invention includes an in-house system 10 in a publishing company publishing books, a system 20 in a printing company printing the books, a mobile phone 30 of a reader purchasing the books. Incidentally, although a medium on which invisible information is printed is paper in the embodiment, a usable physical medium is not limited to paper. It is obvious that the present invention can be applied to a case where invisible information is printed on a printing medium such as a plastic product including a credit card or a cloth product including a garment.

In the embodiment of this invention, the in-house system 10 in the publishing company includes a writer's computer 11, an editor's computer 12 and a web server 13 that are able to communicate with one another through an intranet 14. The web server 13 is for opening information of the publishing company to the public. In the embodiment of this invention, the intranet 14 connects computers to each other with TCP/IP (Transmission Control Protocol/Internet Protocol). In the intranet 14, computers communicating with each other are specified with IP addresses each expressed by a global address or a local address.

The writer's computer 11 has a function of enabling a writer to create a manuscript for an article to be inserted in a book, and additional information and the like on the article. In the embodiment of this invention, general word processing software such as Lotus Word Pro (R) provided by International Business Machines Corporation, Microsoft Word (R) provided by Microsoft Corporation or Ichitaro (R) provided by JustSystems Corporation is installed on the writer's computer 11.

The writer can send a manuscript from the writer's computer 11 to the editor's computer 12 through the intranet 14. In addition, the writer can also upload additional information of a created article from the writer's computer 11 to the web server 13 in order for the reader to access the additional information. In the embodiment of this invention, it is preferable that the address location (URL (Uniform Resource Locator) on the Internet in the embodiment of this invention) of the uploaded additional information be sent together with the manuscript for the created article from the writer's computer 11 to the editor's computer 12 for the purpose of printing the address location as invisible information in the book.

The editor's computer 12 has functions of creating printing data needed for publishing a book by editing and laying out articles and the like received from the writer's computer 11. It should be noted that the editor's computer 12 has a function of creating printing data not only for articles to be printed with a visible ink in a book but also for invisible information to be printed with an invisible ink in the book. The invisible information can be expressed in the form of character and the like, while the embodiment of the present invention employs a two-dimensional barcode (what is termed as a QR code) to indicate invisible information.

In the embodiment of the present invention, the invisible information includes the URL of the uploaded additional information received from the writer's computer 11 together with the created article, but the invisible information is not limited to this. In other words, the editor can receive from another computer, or can create by himself/herself, information other then the URL, which can be invisible information. Incidentally, the editor's computer 12 can be implemented by installing DTP (Desktop Publishing) software having additional functions. In the embodiment of the present invention, the created printing data is stored in a CD-R, which is a general storage medium, and then sent to the printing company. However, although it is obvious to those skilled in the art, the publishing company can use another type of recording medium, or can provide the printing data to the printing company through a network.

The web server 13 has a function of storing data uploaded from computers, such as the writer's computer 11 or the editor's computer 12, connected to the intranet 14 while associating the uploaded data with specific address locations in a predetermined form before storing. The web server 13 has a function of providing the stored data in response to requests from the readers and the like through the Internet.

The system 20 of the printing company according to the embodiment of the present invention includes a printing company's computer 21 and a printer 22 which are connected to each other. The printing company's computer 21 has functions of reading data from a storage medium in which printing data are stored (the CD-R in which the printing data are stored in the embodiment of the present invention), and of then storing the read data in a built-in storage device. In addition, the printing company's computer 21 has a function of causing the printer 22 to print, on the basis of print data stored in the built-in storage device.

The printer 22 has a function of producing books 23 with various kinds of visible inks such as a black ink and/or color inks. The printer 22 may be a small-size printer of a consumer product, of course. However, the embodiment of the present invention employs an assumption that a large amount of books 23 are to be produced. Accordingly, the printer 22 is preferably a large-size offset printer or the like. It should be noted that the printer 22 also has a function of printing the invisible information 24 with an invisible ink. Those skilled in the art should understand that a function of printing such invisible information can be designed as needed, and then added to a conventional printing apparatus to obtain the printer 22.

FIGS. 13 and 14 show image examples of a certain page in the book 23 produced by the printer 22 according to the embodiment of the present invention. FIG. 13 shows an image when the page is viewed under usual visible light. In this case, a reader can see only a usual article, and can read the article normally.

Figure 15:
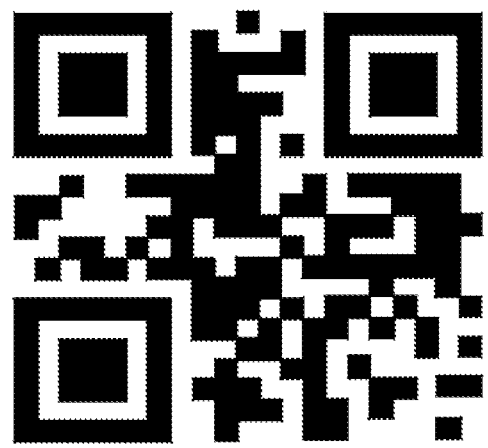
FIG. 15 is an image example of a QR code printed on a page in a book produced by the printing apparatus according to the embodiment of the present invention.

In the embodiment of the present invention, when the reader irradiates the page with light of particular wavelength, the invisible information 24 appears as shown in FIG. 14. In the embodiment of the present invention, the invisible information 24 is a QR code as illustrated in FIG. 15, which is one type of two-dimensional barcodes. The specifications of a QR code are standardized by ISO (ISO/IEC 180004) or JIS (JIS-X-0510). Since the information on the QR code can be obtained easily, detailed explanation is omitted here. In the embodiment of the present invention, the reader of the book 23 reads the QR code with the mobile phone 30 equipped with a camera including a light emitting device 607 which emits light of the particular wavelength, and obtains the invisible information by decoding the QR code with a processing function of the mobile phone.

The reader's mobile phone 30 according to the embodiment of the present invention has a function of accessing the Internet 40 via a digital camera function and a base station 41. In addition, the mobile phone 30 has a function of decoding the two-dimensional barcode 24 of the invisible information which the reader of the book 23 reads with the digital camera function of the mobile phone 30. The reader can access additional information stored in the web server 13 by using the function of accessing the Internet 40 in reference to the URL of additional information related to the article of the book, the URL contained in the invisible information.

The embodiment of the present invention may employ a Personal Digital Cellular (PDC) system, for example, as a system for radio communications between the reader's mobile phone 30 and the base station 41, but the system is not limited to the PDC system. For example, another system such as a Code Division Multiple Access (CDMA) system can be employed as necessary.

In the embodiment of the present invention, the Internet 40 connects the computers to each other by using TCP/IP as is the case with the intranet 14. In the Internet 40, computers that are about to communicate with each other are specified with IP addresses each expressed by a global address or a local address.

Figure 7:
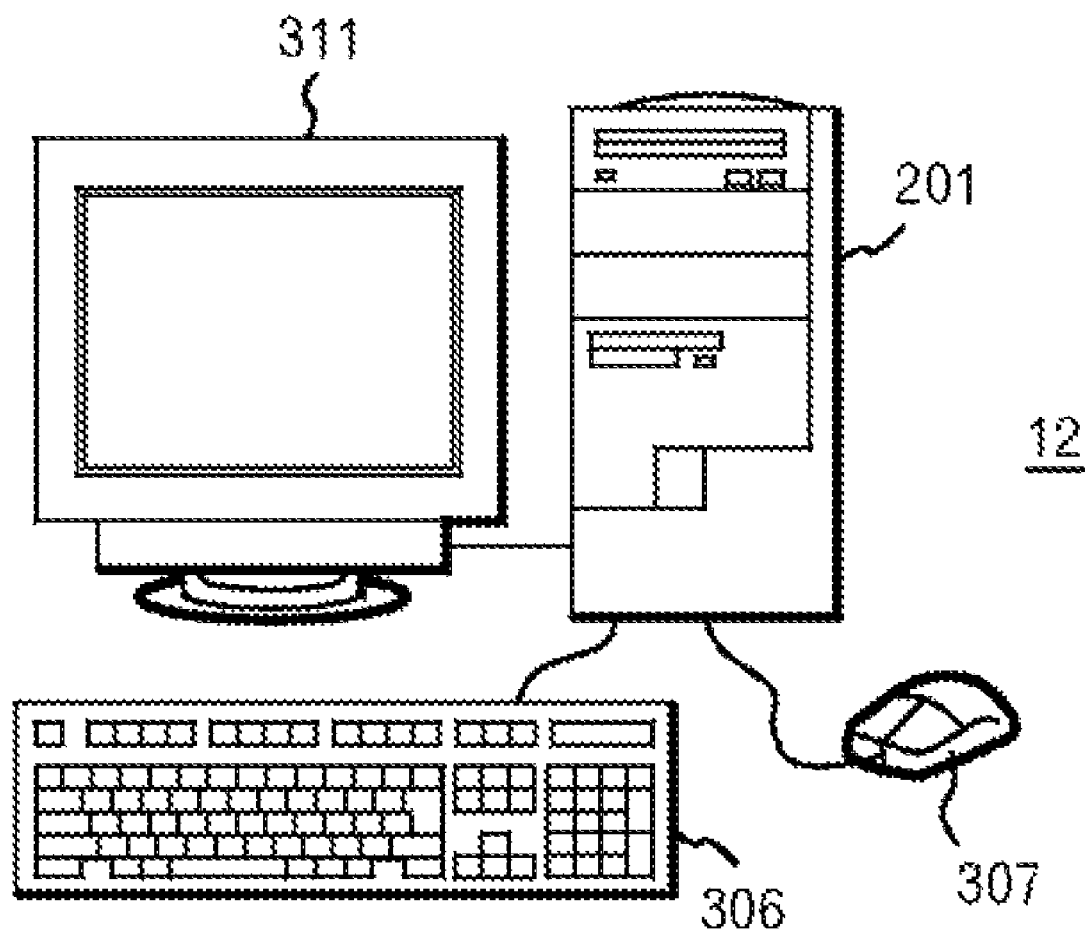
FIG. 7 is a diagram showing an example of an external appearance of an information processing apparatus preferable for constructing a writer's computer, an editor's computer, a web server or a printing company's computer according to the embodiment of the present invention.

FIG. 7 is a diagram showing an example of an external appearance of an information processing apparatus preferable for constructing the writer's computer 11, the editor's computer 12, the web server 13 or the printing company's computer 21 according to the embodiment of the present invention. The information processing apparatus 200 includes a main body 201, a keyboard 306, mouse 307 and a display device 311. A user of the information processing apparatus 200 can carry out desired operations such as document creation and editing, control of the printer, and the like.

In addition, the user can check the status of work whenever the user views information visually displayed on the display device 311.

Figure 8:
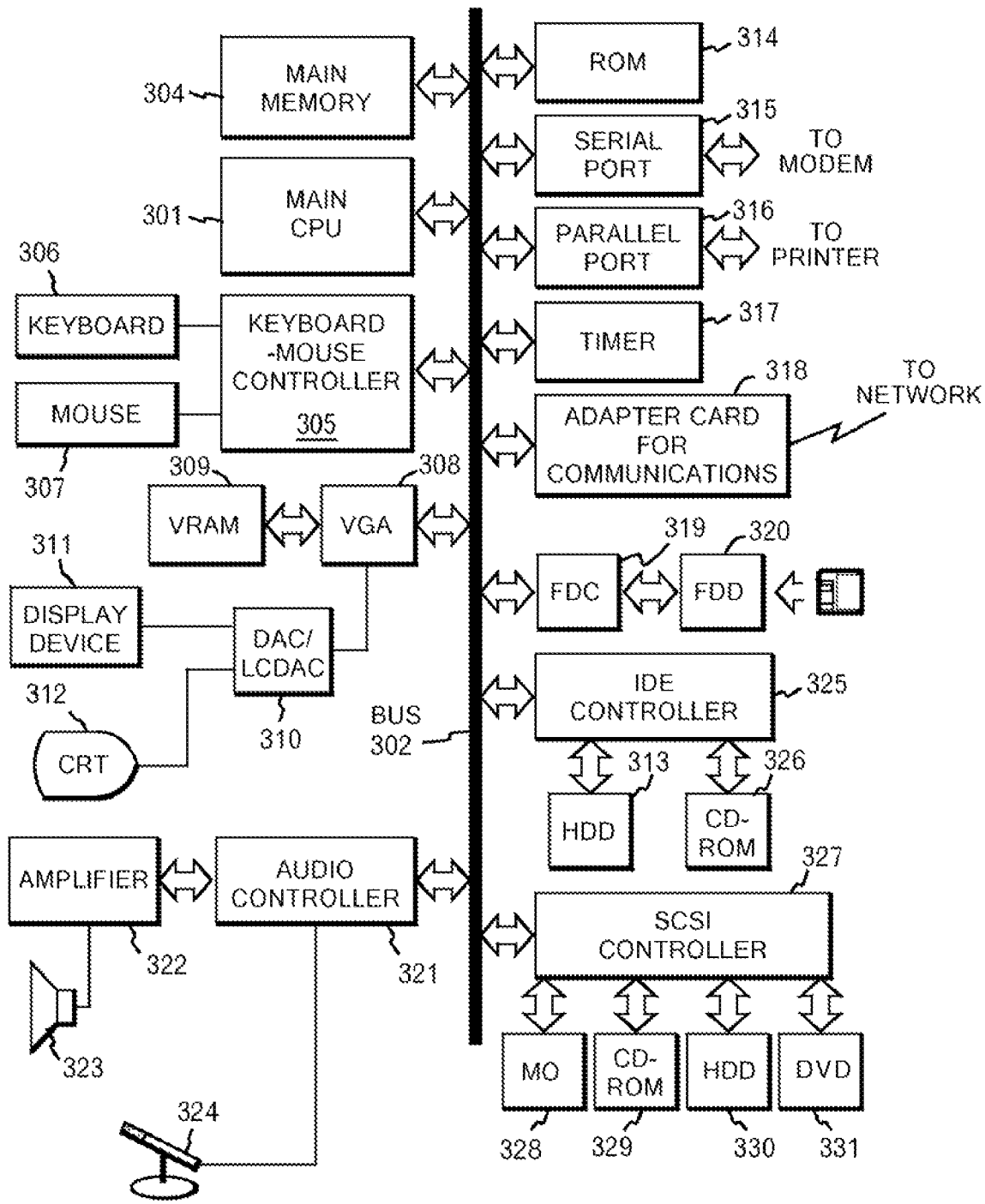
FIG. 8 is a diagram showing an example of a hardware configuration of an information processing apparatus preferable for constructing the writer's computer, the editor's computer, the web server or the printing company's computer according to the embodiment of the present invention.

FIG. 8 is a diagram showing an example of a hardware configuration of an information processing apparatus 200 preferable for constructing the writer's computer 11, the editor's computer 12, the web server 13 or the printing company's computer 21 according to the embodiment of the present invention. The information processing apparatus 200 includes a central processing unit (CPU) 301 and a main memory 304 connected to a bus 302. Removable storages (external storage systems using exchangeable storage media), such as hard disk devices 313 and 330, CD-ROM devices 326 and 329, a flexible disk device 320, an MO device 328, a DVD-ROM device 331, are connected to the bus 302 via an IDE controller 325, a SCSI controller 327 and the like.

A storage medium such as a flexible disk, an MO, a CD-ROM or a DVD-ROM is inserted in one of the removable storages. Any of these storage media, the hard disk devices 313 and 330 and a ROM 314 can be used for storing codes of a computer program for implementing the present invention by giving instructions to the CPUs and the like in cooperation with an operating system. The computer program is loaded to a main memory 304, and thus is executed. The computer program can be compressed to be stored in a single storage medium, or be divided into more than one piece to be stored in more than one storage medium.

The information processing apparatus 200 receives inputs from user interface devices such as a keyboard 306 and a mouse 307 via a keyboard/mouse controller 305. The information processing apparatus 200 is connected via a DAC/LCDC 310 to a display device 311 for showing visual data to a user.

The information processing apparatus 200 is connected to a network through a network adapter 318 (an Ethernet (R)-card or a token ring card) or the like, and is capable of communicating with other computers and the like. Although not illustrated in FIG. 8, the information processing apparatus 200 can be connected to a printer via a parallel port, or to a modem via a serial port.

It is easily understood from the above description that the information processing apparatus 200 preferable for constructing the writer's computer 11, the editor's computer 12, the web server 13 or the printing company's computer 21 is composed of a main frame, a workstation, a usual personal computer or the like, or a combination of these machines. However, these components are only examples, and the present invention does not always require all the above components as essential components.

It is obvious to those skilled in the art that various modifications can be made on the information processing apparatus 200 used in the embodiment of the present invention. One example of the modifications is that a plurality of machines are combined and that then functions are assigned to the combined machines. As a matter of course, these modifications are also ideas included in the spirit of the present invention.

As an operating system that supports a graphical user interface (GUI) multi-window environment, the information processing apparatus 200 can employ any of a Windows(R) operating system provided by Microsoft Corporation, AIX (R) provided by International Business Machines Corporation, a Mac OS(R) provided by Apple Incorporated, and a Linux(R).

As the operating system, the information processing apparatus can also employ an operation system on a character-based environment such as PC-DOS provided by International Business Machines Corporation or MS-DOS provided by Microsoft Corporation. In addition, the information processing apparatus 200 can employ a real-time OS such as OS Open provided by International Business Machines Corporation, a built-in operating system in a network computer such as a Java (R) OS.

It can be understood from the above description that the information processing apparatus 200 used in the embodiment of the present invention is not limited to a particular operating system.

Figure 9:
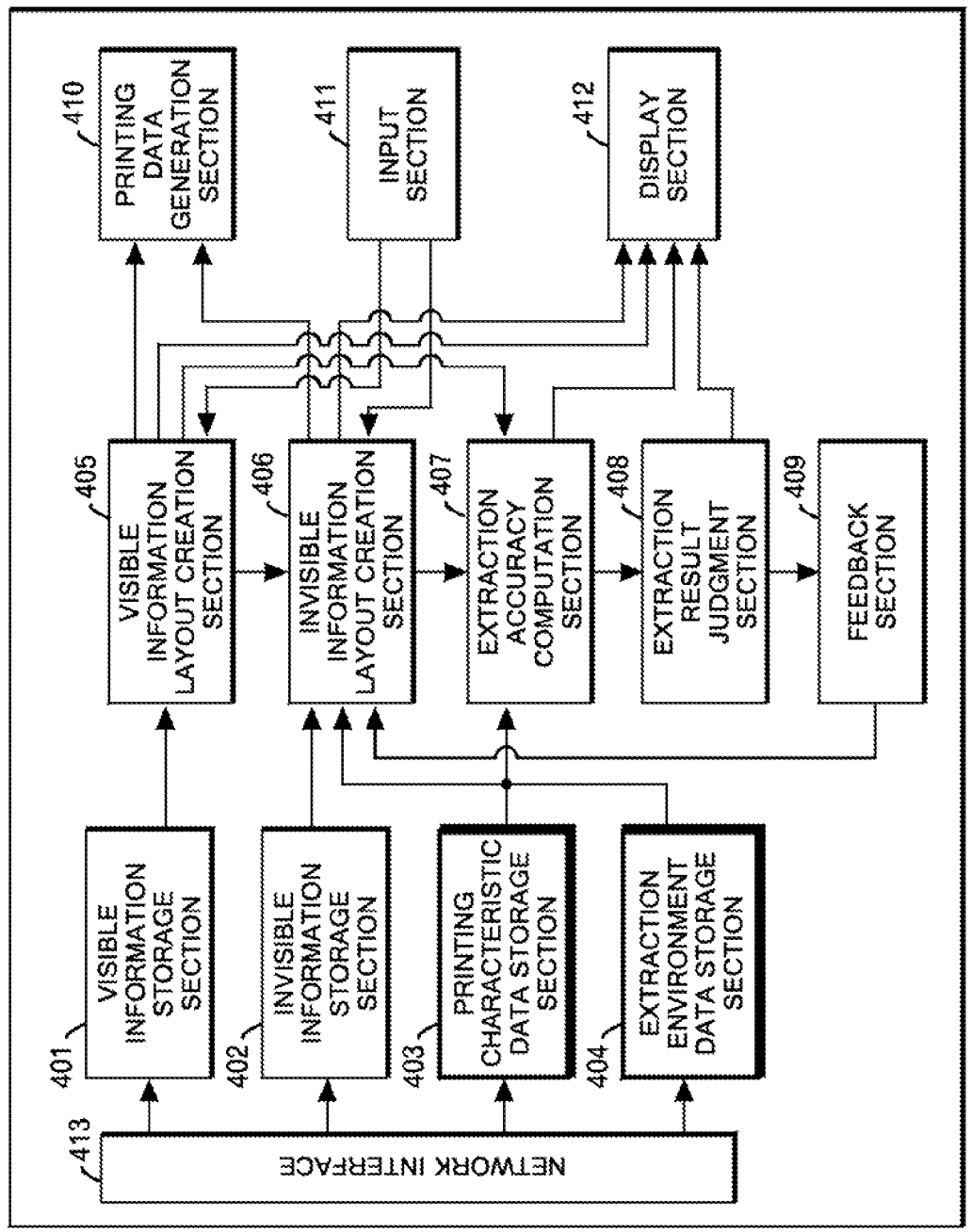
FIG. 9 is a functional block diagram of the editor's computer of the embodiment of the present invention.

FIG. 9 is a functional block diagram of the editor's computer 12 of the embodiment of the present invention. Note that each component shown in the functional block diagrams in FIG. 9 and the like can be obtained by causing hardware resources and software to collaborate with each other in the information processing apparatus 200 having the hardware configuration illustrated in FIG. 8. Such collaboration can be carried out firstly by loading the computer program stored in the hard disk device 6 to the main memory 304, and then by causing the CPU 301 to read the loaded program.

The editor's computer 12 includes a visible information storage section 401, an invisible information storage section 402, a printing characteristic data storage section 403, an extraction environment data storage section 404, a visible information layout creation section 405, an invisible information layout creation section 406, an extraction accuracy computation section 407, and an extraction result judgment section 408, a feedback section 409 and a printing data generation section 410. In addition, the editor's computer 12 further includes an input section 411, a display section 412 and a network interface 413 to serve as interfaces between itself and a user, or between itself and an external computer.

The printing characteristic data storage section 403 and the extraction environment data storage section 404 are equivalent to the color data base (DB) 9 shown in FIG. 2, since input parameters obtained by the parameter obtaining device in FIG. 2 are, for example, typically stored in these storage sections 403 and 404.

The visible information storage section 401 stores, in digital format, information to be printed with a visible ink on a physical medium in a book, the information including a manuscript for an article created by the writer's computer 11. The invisible information storage section 402 stores, in digital format, invisible information received from other computers including the writer's computer 11 through the network interface 412, or created by an editor, himself/herself. In the embodiment of the present invention, the invisible information contains the URL of additional information of the article created with the writer's computer 11. The printing characteristic data storage section 403 stores, in digital format, characteristics related to book printing. The characteristics include: characteristics of a physical medium such as a color and stain of paper; information on the colors of inks to be used to print visible information and/or invisible information, for example. The extraction environment data storage section 404 stores, in digital format, information on environments where a reader extracts invisible information. Examples of the information on environments includes: estimated image pickup performance of a digital camera; performance of a light emitting device to be used to emit light of particular wavelength (for example, a characteristic of an LED); an image pickup distance; an image pickup angle, brightness at an image pickup time; and the like.

The visible information layout creation section 405 generates visible information layout data based on data stored in the visible information storage section 401. In the embodiment of the present invention, the visible information layout data is generated manually or semi-automatically by following inputs by the editor to the input section 411. Since this layout data generation is not an essential point of the present invention, the detailed description is omitted here. On the other hand, the invisible information layout creation section 406 generates invisible information layout data based on data stored in the invisible information storage section 402. The embodiment of the present invention employs an assumption that the invisible information layout data is automatically generated, but the editor can adjust the invisible information layout data by operating the input section 411. Note that the invisible information layout data in the embodiment of the present invention includes image data of a QR code which is one type of two-dimensional barcodes, and which is an image pattern representing all or part of the invisible information.

The extraction accuracy computation section 407 simulates invisible information extraction and computes the accuracy in invisible information extraction, by using the layout data for visible information generated by the visible information layout creation section 405, and the invisible information layout data generated by the invisible information layout creation section 406. For the purpose of performing a simulation, the embodiment of the present invention uses data stored in the printing characteristic data storage section 403 and the extraction environment data storage section 404. The extraction result judgment section 408 judges whether or not the accuracy in invisible information extraction computed by the extraction accuracy computation section 407 satisfies a predetermined condition. When the extraction result judgment section 408 judges that the extraction accuracy does not satisfy the predetermined condition, the invisible information layout creation section 406 generates new invisible information layout data, and the extraction accuracy computation section 407 and the extraction result judgment section 408 are activated to target the new invisible information layout data.

When the extraction result judgment section 408 judges that the extraction accuracy does not satisfy the predetermined condition, the feedback section 409 transmits, to the invisible information layout creation section 406, feedback information which is to be referred to when the new invisible information layout data is generated. In the embodiment of the present invention, the invisible information layout creation section 406 optimizes the invisible information layout data according to the feedback, and then generates new invisible information layout data. The layout data is optimized by modifying positions of elements contained in the layout data; deforming the entire or part of a QR code; modifying the size of the QR code; decreasing and increasing the number of the elements; and modifying error correction ability, for example, but the optimization methods for the layout data are not limited to the above.

When the extraction result judgment section 408 judges that the extraction accuracy satisfies the predetermined condition, the printing data generation section 410 generates printing data for invisible information from the invisible information layout data. In addition, the printing data generation section 410 also generates printing data for visible information from the layout data for visible information generated by the visible information layout creation section 405. In the embodiment of the present invention, printing data for visible information and/or invisible information are stored in a CD-R, that is, an easily available storage medium which is commercially distributed in general, and thus is sent to the printing company 20.

The input section 411 receives input operations performed by the editor, and permits the layout adjustment for visible information and/or invisible information, and the like. A display section 412 displays the currently working layouts of the visible information and invisible information, a computation result and judgment result of extraction accuracy, and the like. The editor can operate the input section 409 by referring to the information displayed on the display section 412. The network interface 413 has a function of exchanging information through the intranet 14. The editor's computer 12 receives information on a manuscript of an article and the like from the writer's computer 11 by using the network interface 413, and then stores them in the visible information storage section 401 and the like.

Figure 10:
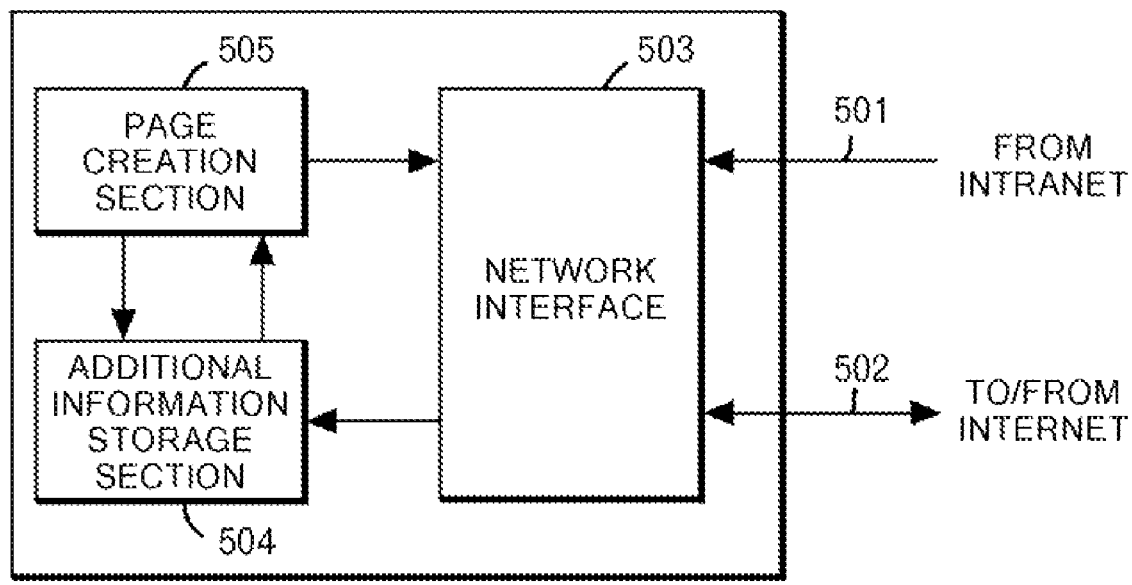
FIG. 10 is a functional block diagram of the web server according to the embodiment of the present invention

FIG. 10 is a functional block diagram of the web server 13 according to the embodiment of the present invention. The web server 13 includes a communication interface 503, an additional information storage section 504 and a webpage creation section 505. Note that those skilled in the art can easily construct such a web server 13 by installing software for web server construction such as free software named Apache or a product named IIS provided by Microsoft Corporation, on an information processing apparatus having a hardware configuration illustrated in FIG. 8.

The network interface 503 stores data of additional information in the additional information storage section 504 in association with the URL of the additional information. Here, the data of additional information is uploaded from a computer such as the writer's computer 11 or the editor's computer 12 connected to the intranet 14 through a route 501. In addition, the network interface 503 may also receive a request containing the URL of the additional information from the reader's mobile phone 30 through a route 502, and transfer the request to the webpage creation section 505. In response to the request received from the reader's mobile phone 30 through the network interface 503, the webpage creation section 505 composes a webpage based on the additional information stored in the additional information storage section 504, and returns the webpage to the mobile phone 30 through the route 502.

Figure 11:
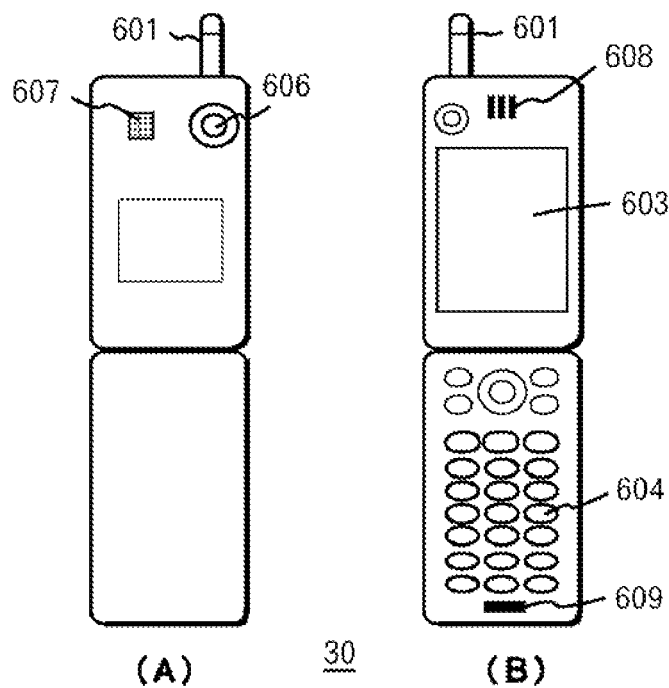
FIG. 11 shows diagrams of an external appearance of a reader's mobile phone according to the embodiment of the present invention.

FIG. 11 shows diagrams of an external appearance of the reader's mobile phone 30 according to the embodiment of the present invention. As is clear from in FIG. 11, the mobile phone 30 includes an antenna 601, a display 603, an input section 604, a camera 606, a light emitting device 607, a speaker 608 and a microphone 609. The appearance of the reader's mobile phone 30 is the same as that of a conventional mobile phone except that the mobile phone 30 includes the light emitting device 607 emitting light of particular wavelength for making an invisible ink visible. Note that the light emitting device 607 can be fabricated by providing a commercially available light emitting diode (LED) to serve as an ultraviolet LED.

Figure 12:
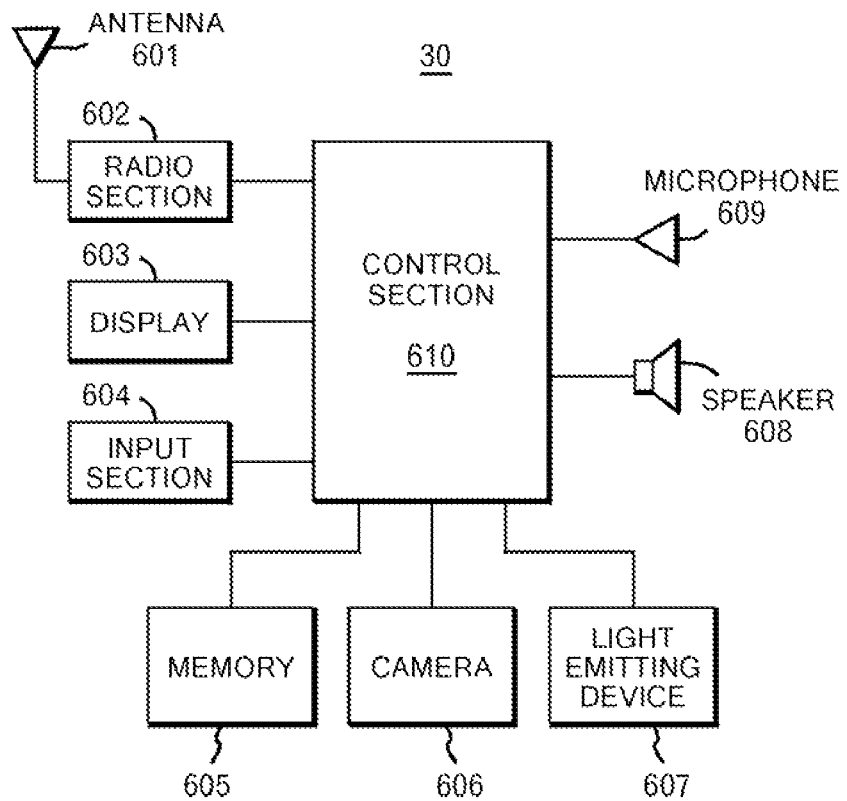
FIG. 12 is a functional block diagram of the reader's mobile phone according to the embodiment of the present invention.

FIG. 12 is a functional block diagram of the reader's mobile phone 30 according to the embodiment of the present invention. As is clear from FIG. 12, the mobile phone 30 includes a radio section 602, a memory 605 and a control section 610 in addition to the antenna 601, the display 603, the input section 604, the camera 606, the light emitting device 607, the speaker 608 and the microphone 609 already described with reference to FIG. 11.

The antenna 601 has functions of receiving radio waves transmitted from the base station 41 and of transmitting radio waves from the radio section 602 to the base station 41. The radio section 602 converts radio waves received by the antenna into electric signals, and vice versa. The display 603 displays information to an operator. The operator operates the mobile phone 30 by use of the input section 604 by referring to the displayed information. The memory 605 is used to store information on an image picked up by the camera 606 and the like. The camera 606 includes a lens and picks up an image. In addition, the light emitting device 607 emitting light of particular wavelength causes invisible information to emit light. The operator receives voice through the speaker 608, and inputs voice through the microphone 609. These components are controlled by the control section 610.

Figure 16:
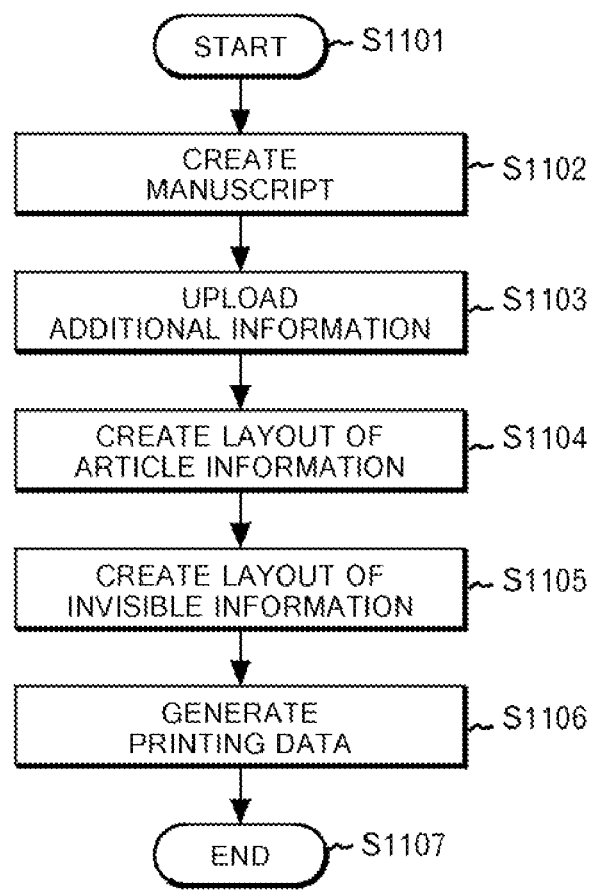
FIG. 16 is a flow chart showing an outline of a processing procedure for generating printing data of a book in the embodiment of the present invention.

FIG. 16 is a flow chart 1100 showing an outline of a processing procedure for generating printing data for a book, in the embodiment of the present invention. The processing starts from step 1101, and the writer creates a manuscript of an article and additional information related to the article by using word processing software installed on the writer's computer 11.

The processing moves to step 1103. The writer's computer 11 transmits the manuscript of the article to the editor's computer 12. In addition, in step 1103, the writer's computer 11 uploads the additional information to the web server 13.

Next, in step 1104, the article to be printed with a visible ink is edited, and the layout of the article is designed. In the embodiment of the present invention, the layout of the article to be printed with the visible ink is taken into account when the layout of invisible information is designed. Accordingly, this step 1104 is preferably performed before the layout of the invisible information is designed.

The processing moves to step 1105, and the layout of the invisible information is designed. In the embodiment of the present invention, the invisible information is expressed as a QR code, which is one type of two-dimensional barcodes. Note that the processing of this step 1105 will be described in more detail later. Then, in step 1106, the printing data are generated from the article and the layout of the invisible information determined in steps 1104 and 1105. The generated printing data are stored in a storage medium such as a CD-R, and then sent to the printing company. After that, the processing moves to step 1107, and the printing data generation processing ends.

Figure 17:
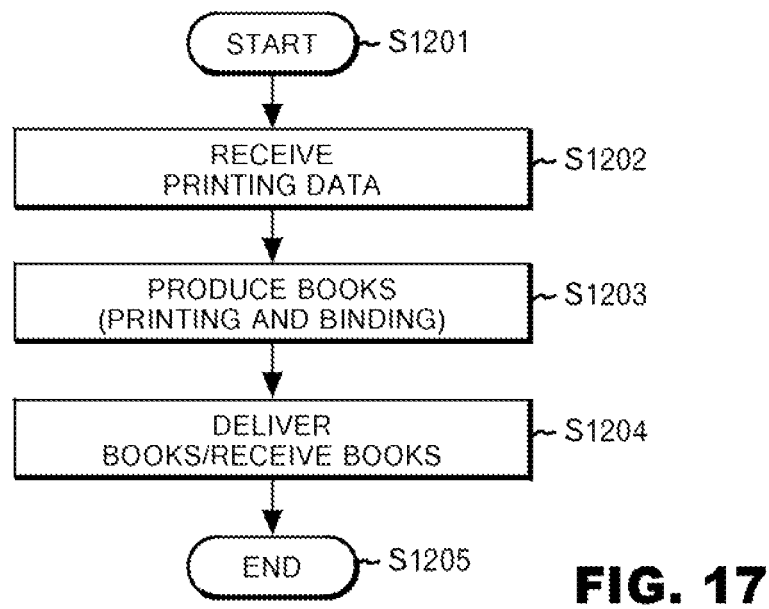
FIG. 17 is a flow chart showing processing in an in-house system of the printing company receiving printing data according to the embodiment of the present invention.
Figure 18:
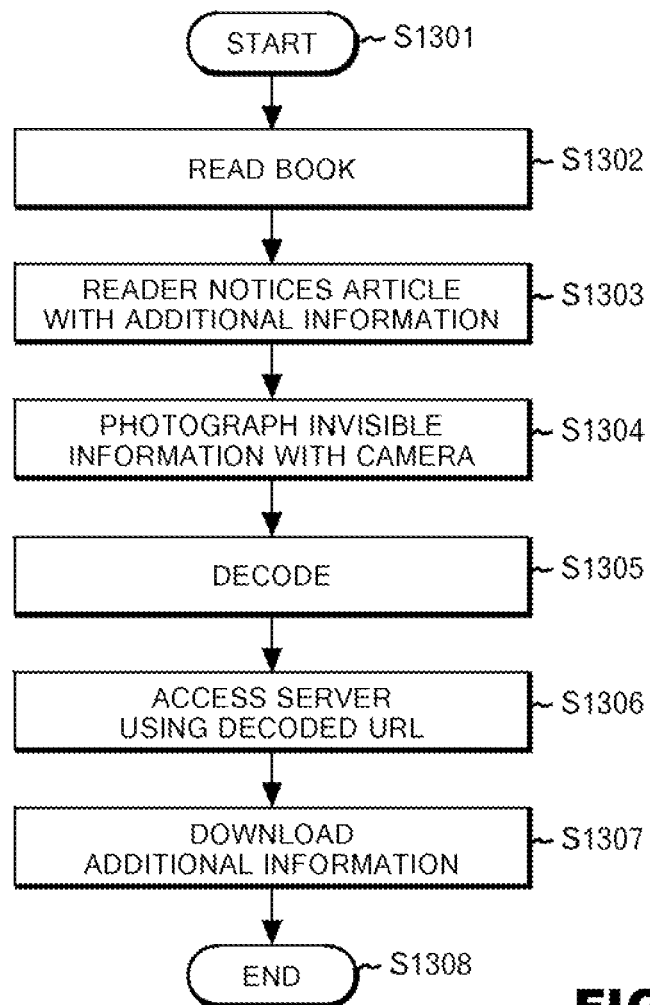
FIG. 18 is a flowchart showing processing from a point when the reader receives the book of the embodiment of the present invention until a point when the reader obtains the additional information of the article in the book.

Hereinafter, processing in in-house system 20 of the printing company receiving printing data will be described with reference to a flow chart 1200 shown in FIG. 17. The processing starts from step 1201. In step 1202, the printing company receives the printing data stored in the storage medium and loads the printing data to the printing company's computer 21. The processing moves to step 1203, and the printing company prints the article information with the visible ink and the QR code with an invisible ink while operating the computer 21 to control the printer. After that, the printing company binds a book and the like, thereby producing the book. In step 1204, the produced book is delivered and received by the reader through a commercial channel In addition, with reference to a flow chart in FIG. 18, a description will be provided for processing from a point when the reader receives the book of the embodiment of the present invention until a point when the reader obtains the additional information of the article in the book. The processing starts from step 1301. In step 1302, the reader reads the purchased book. The processing moves to step 1303, and the reader notices that additional information is attached to a certain article in the book, and then desires to obtain the additional information. In this case, in next step 1304, the reader picks up an image of the QR code by using the camera 606 of the mobile phone 30, after the light emitting device 607 starts emitting light, and thus captures the image to the mobile phone 30. Next, in step 1305, the QR code is decoded and thereby the URL of the additional information is obtained. After that, the processing moves to step 1306, and the mobile phone 30 accesses the web server 13 by using the decoded and obtained URL of the additional information. In step 1307, the mobile phone 30 downloads the additional information. The reader can check the downloaded additional information, for example, on the display 603 of the mobile phone 30. The processing moves to step 1308 and ends.

Figure 19:
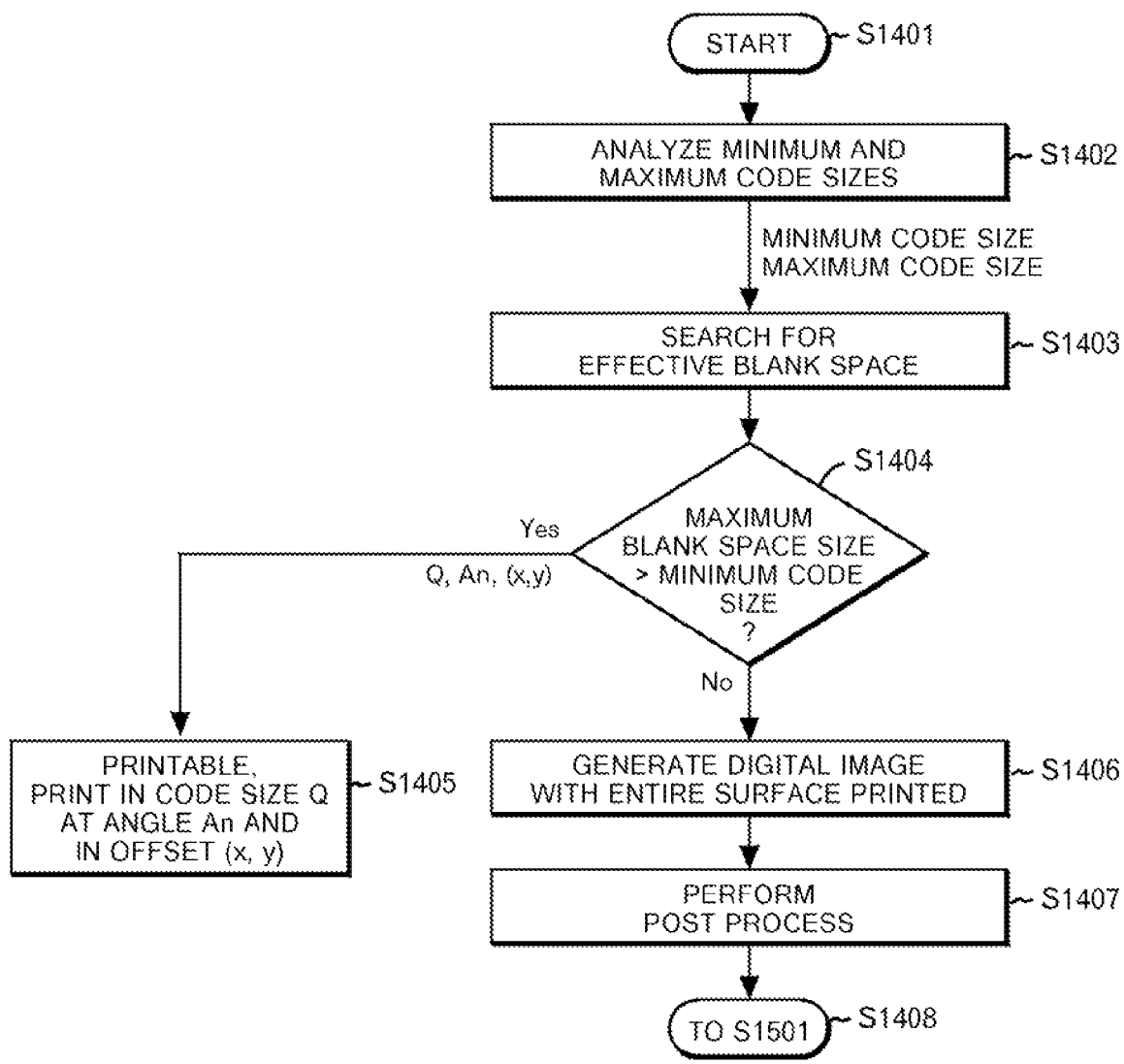
FIG. 19 is a flow chart showing processing for generating print data of a QR code to be printed as invisible information according to the embodiment of the present invention.

Subsequently, the processing for generating the invisible information layout data described as step 1105 in FIG. 16 will be described in more detail by referring to FIGS. 19 to 21. In the embodiment of the present invention, the printer 22 prints a square QR code as an example of the invisible information. However, note that the shape of a QR code is not limited to the square, or a code itself is not limited to the QR code in order to implement the present invention.

Figure 22:
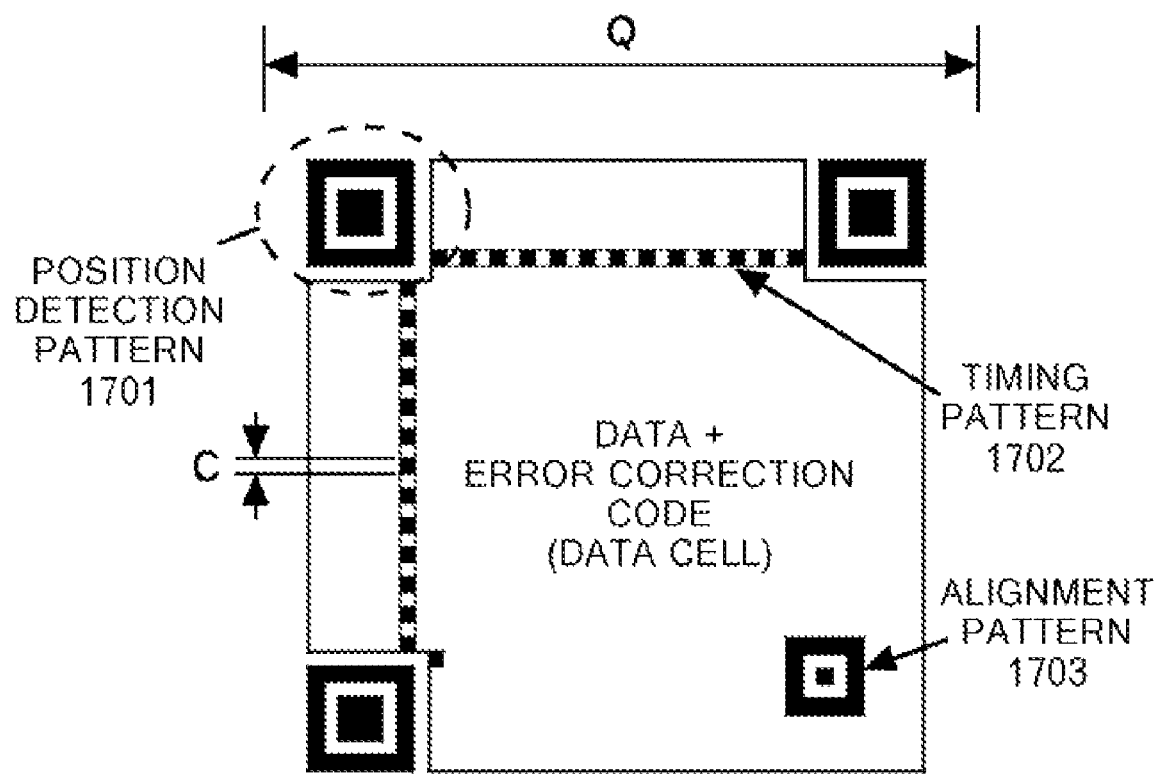
FIG. 22 is a diagram showing an image of the QR code according to the embodiment of the present invention.

The processing starts from step 1401. In step 1402, the editor's computer 12 determines the minimum and maximum values of the size of a QR code (simply called a "code size" below) representing invisible information, by using data stored in the printing characteristic data storage section 403 and the extraction environment data storage section 404. More precisely, the minimum value of the code size is computed from the number of pixels of a camera, for example. In contrast, the maximum value of the code size is determined by using an image pickup angle, light intensity, an image pickup distance, and brightness at an image pickup time of the light emitting device (LED), for example. Those skilled in the art should note that the methods for computing the maximum and minimum values can be designed as needed. Incidentally, in the embodiment of the present invention, the code size means the length of one side of a QR code including the margin (Q in FIG. 22).

Then, in step 1403, the editor's computer 12 digitalizes an image of a physical medium on which the QR code is to be printed, and then attempts to find out a blank space having a side greater than the minimum value of the code size determined in step 1402. In the embodiment of the present invention, the blank space is defined as a square area whose image has a luminance value with a standard deviation smaller than a certain value T1. When a blank space having a side larger than the minimum value of the code size determined in step 1402 is found out, the processing moves to step 1405. Thus, it is determined to print the QR code on the found-out blank space. In other words, in step 1404, assuming that D denotes the minimum value of the code size, if at least one square blank space having a side larger than E, that is, satisfying E=>D is found out (a blank space rotated at a certain angle is also acceptable), the processing moves to step 1405 through the YES branch.

In the embodiment of the present invention, if there are multiple blank spaces on which the QR code can be printed, and if there are multiple blank spaces each satisfying a rotation angle An=0 of the QR code, the blank space having the maximum value of E is selected for a printing place of the QR code out of the multiple blank codes. In contrast, if there is no blank code satisfying the rotation angle An=0 of the QR code, the blank space having the maximum value of E is selected for the printing place of the QR code even though the rotation angle of the blank space is An≠0. In these two cases, the offset (x, y) and the rotation angle An are outputted as parameters. After the processing in step 1405 is performed, the processing moves to step 1408 and ends.

In contrast, if no square blank space having a side larger than E, that is, satisfying E=>D is found out in step 1404, the processing moves to step 1406 through the NO branch. In step 1406, the editor's computer 12 generates a digital image representing a state in which the invisible ink is overprinted on the entire image to be printed on the physical medium.

After generating the digital image representing the state in which the invisible ink is overprinted on the entire image, the processing moves to step 1407. Then, the editor's computer 12 generates an image (called "I0: without ink") by performing a post process on a print image of the QR code, and also generates an image (called "I1: with ink") by performing the post process on the image to be printed on the physical medium. In the embodiment of the present invention, the post process means image processing in which an image is processed so as to reflect various probable phenomena that might influence on the image when the image of a QR code is picked up in order to extract invisible information (for example, sampling depending on the number of pixels of a camera, blurring of an image attributable to a characteristic of paper, and the like). In the embodiment of the present invention, an image of "I1: with ink" is one obtained by applying, onto the entire surface, the color component (for example, R, G, B, T, Cb or Cr) that occupies the largest amount as color components in the invisible ink. Meanwhile, an image of "I0: without ink" is one obtained without applying the color component onto the surface. In addition, in step 1407, the editor's computer 12 computes and holds the mean value of luminance values of squares each having a side with a length of a search step S. Thereafter, the processing moves to a flow chart shown in FIG. 20 through step 1408.

Figure 20:
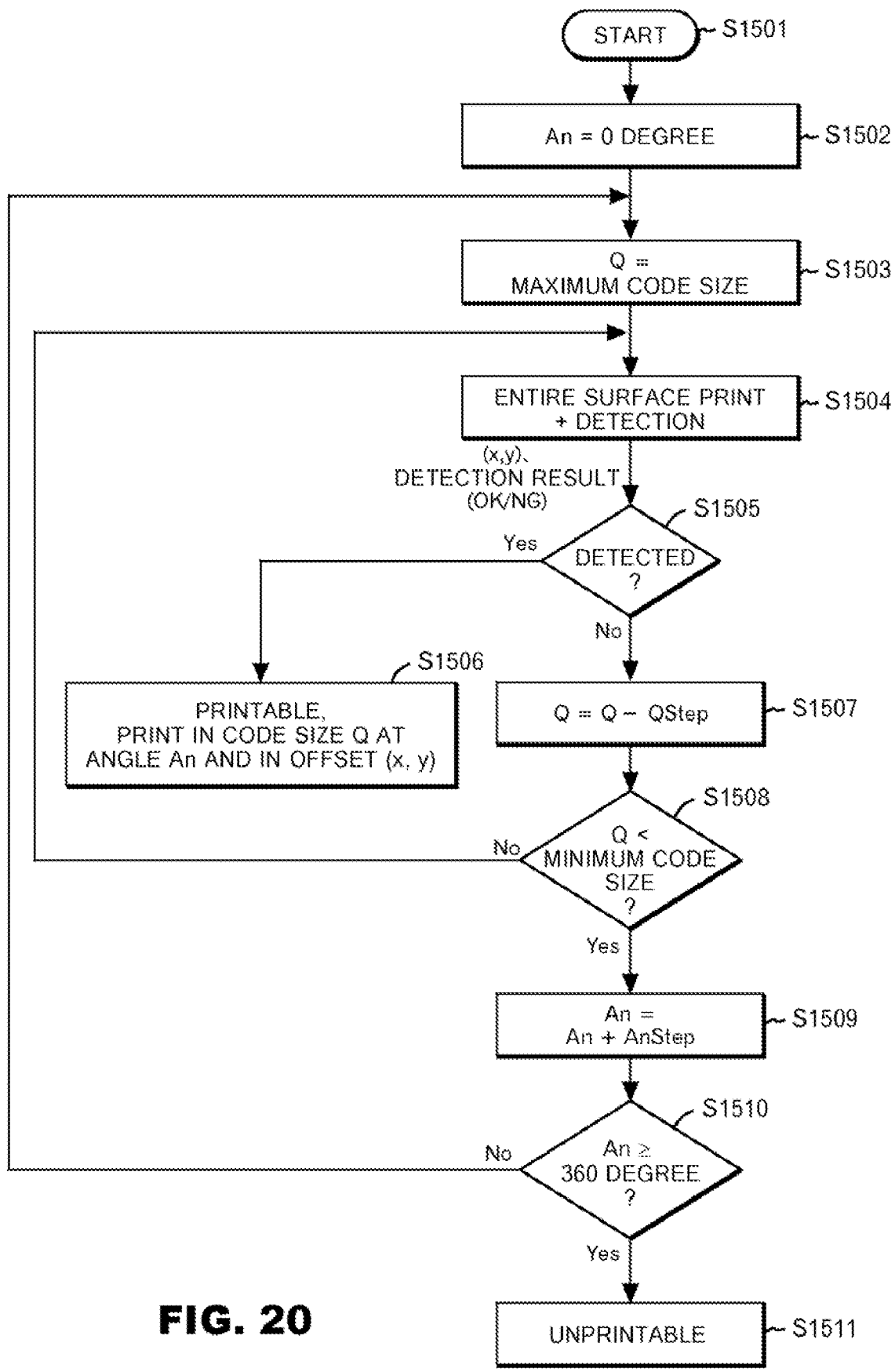
FIG. 20 is a flow chart showing the processing for generating the print data of the QR code to be printed as the invisible information according to the embodiment of the present invention.

A flow chart 1500 in FIG. 20 starts from step 1501. In the step next to step 1501, the extraction accuracy of the invisible QR code is computed using both images of "I0: without ink" and "I1: with ink" while values of the QR code size and the rotation angle An are changed. Instead of changing the values of the QR code size and the rotation angle An, values of the aspect ratio of the QR code and the like may be changed to compute the extraction accuracy. Here, however, assuming that the aspect ratio of the QR code is fixed in order to simplify the description, the embodiment of the present invention will be described below.

The processing starts from step 1501. In step 1502, the initial value of the rotation angle An is set to 0 degree. Next, in step 1503, the initial value of the QR code size Q is set to the maximum value of the code size, and then the processing moves to step 1504. In step 1504, a position for the QR code which allows the invisible information to satisfy the condition of extraction accuracy is searched out while the QR code is shifted by the search step S (C=kS, where C denotes the size of a side of a cell (a white or black square that is a constituent unit of the QR code)). Hereinafter, an example of an algorithm for the search in step 1504 will be described in detail by referring to a flow chart in FIG. 21.

Figure 21:
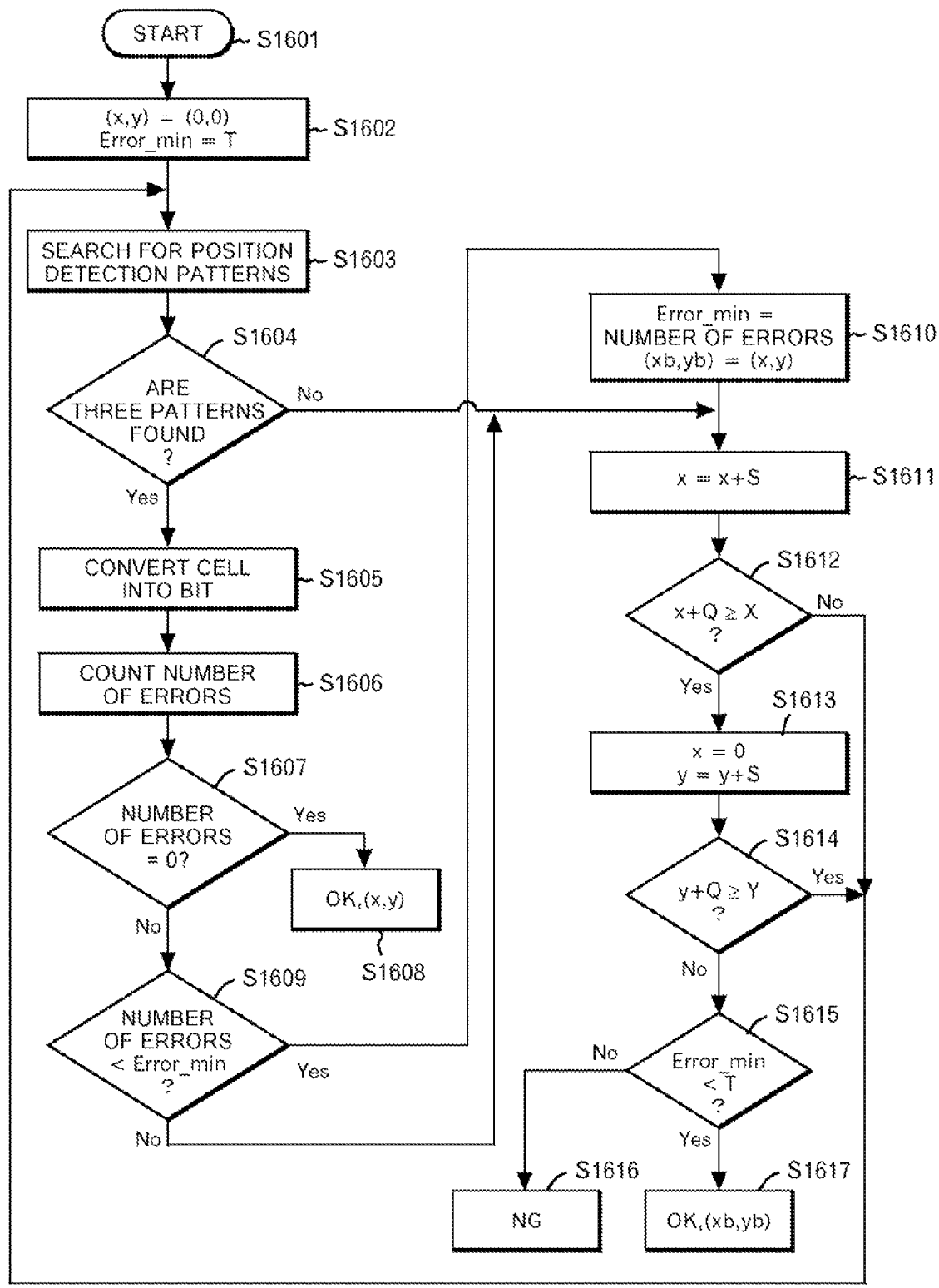
FIG. 21 is a flow chart showing an example of an algorithm for searching for a position of the QR code which allows the invisible information to satisfy a condition of predetermined extraction accuracy according to the embodiment of the present invention.

FIG. 21 is a flow chart 1600 representing an example of the algorithm for the search in step 1504 in the flow chart in FIG. 20. The processing starts from step 1601. In step 1602, an offset value (x, y) (a position of the upper-left edge of the QR code) of the QR code to be shifted is initialized by setting its initial value to (0, 0). In addition, in step 1602, Error_min representing the minimum value of errors is initialized by setting its initial value to T (T denotes 1+the number of error collectable cells in the QR code).

Next, in step 1603, an image of the QR code to be printed is generated using both of the images of "I0: without ink" and "I1: with ink." Specifically, the image of the QR code can be generated by cutting a part of the image of "I1: with ink" per S×S unit for a part to be printed (black part in the QR code), by cutting a part of the image of "I0: without ink" per S×S unit for a part not to be printed (white part in the QR code and the outside of the QR code), and then by combining these cut parts with each other. Moreover, in step 1603, position detection patterns 1701 contained in the QR code are searched out using the generated image of the QR code. In the search for the position detection patterns 1701, it is judged whether or not three position detection patterns can be detected, the patterns satisfying the following conditions (hereinafter, referred to as "position detection pattern conditions"): (1) the patterns do not overlap with each other; and (2) the distance between two detected patterns (taking as an example the case of the two position detection patterns on the upper side in FIG. 17, this distance means a distance between the right edge of the left position detection pattern and the left edge of the right position detection pattern) is equal to or longer than twice the length of a side of the smallest detected position detection pattern.

As a method for judging whether or not three position detection patterns can be detected, the following method can be recited as an example. Firstly, assume that L denotes the mean value of luminance values in a code whose patterns are to be detected, and that M(x, y) denotes the mean value of luminance values in each S×S square for search in the offset (x, y). Then, f(x, y) is defined as follows:

$$f(x, y)=1 (\text{if } M(x, y)<L) \quad \text{(Formula 1)}$$

0(otherwise)

Then, assume that N1, N2, N3, ... each denotes the length of successive squares for search f(x, y)=1 or f(x, y)=0, and that $\Delta_1$ and $\Delta_2$ each denotes a value within a given error allowable range. On these assumptions, it is judged that three position detection patterns are detected in a case where squares for search satisfying the following condition are found out in both of a horizontal direction and a vertical direction, and where concurrently, reproduction of the three position detection patterns succeeds by using these found-out squares.

$$N1:N2:N3:N4:N5=1+\Delta_1:1+\Delta_1:3+\Delta_2:1+\Delta_1:1+\Delta_1 \quad \text{(Formula 2)}$$

Incidentally, when four or more patterns satisfying "the position detection pattern conditions" are found out, the subsequent processing may be repeated by selecting arbitrary three patterns out of the patterns satisfying the position detection pattern conditions until the print position of the QR code is found out. In this case, the subsequent processing is repeated at most $_hC_3$ times (h: the number of patterns satisfying "position detection pattern conditions"). Instead, when four or more patterns satisfying "the position detection pattern conditions" are found out, it is also possible to perform pattern matching to select three patterns each having a shape similar to that of the position detection pattern, and satisfying "the position detection pattern conditions," and then to perform the subsequent processing using the selected three patterns.

When three position detection patterns are detected, the rotation angle An can be figured out by computing the values of N1, N2, N3, N4 and N5 (of Formula 2) while shifting horizontal components and vertical components little by little.

When three position detection patterns are found in step 1604, the processing moves to step 1605 through the YES branch. In step 1605, an area for the QR code is limited by using the position detection patterns found in step 1604, and then a bit conversion of the area is carried out.

The area for the QR code is limited in a way that, when the rotation angle An is 0, for example, a square having three corners corresponding to the found position detection patterns is regarded as the area for the QR code. The bit conversion is carried out according to values g(s, t) defined by the following formula 3, where U(s, t, r) denotes the mean value of luminance values in an r×r square (r<=C) whose mass is the center of each C×C cell in the position (s, t), and V denotes the mean value of luminance values in the area for the QR code. More precisely, the bit conversion in step 1605 is carried out by generating a QR code while a cell having a value g(s, t)=1 is set to be black, and a cell having a value g(s, t)=0 is set to be white.

$$g(s, t)=1 (\text{if } U(s, t, r)<V) \quad \text{(Formula 3)}$$

0(otherwise)

In the above description, V is the mean value of luminance values in the entire QR code. However, since the QR code may include variations in color tone in some cases, V can be determined as the mean value V(s, t, Z) of luminance values in a square having a side length Z and having the center at the position (s, t).

Next, in step 1606, errors in the bit conversion are counted. Specifically, by comparing the QR code to be actually printed with the QR code generated through the bit conversion, the number of cells each having black and white inverted are counted as the number of errors (incidentally, excluding position detection, timing and alignment patterns). After that, in step 1607, a judgment is made as to whether or not the number of errors in the bit conversion counted in step 1606 is 0. If the number of errors is judged as 0, the processing moves to step 1608 through the YES branch, and the offset value at this time is determined as a position on which the QR code is to be printed.

When the number of errors is judged as not 0 in step 1607, the processing moves to step 1609 through the NO branch, and a judgment is made as to whether the number of current errors is smaller than the minimum value (Error_min) of the number of past errors. If it is judged in step 1609 that the number of current errors is smaller than the minimum value of the number of past errors, the value of Error_min is updated to the number of current errors, and the offset value is recorded to (xb, yb). Thereafter, the processing moves to step 1611. If it is not judged in step 1609 that the number of current errors is smaller than the minimum value of the number of past errors, the processing moves to step 1611 through the NO branch without updating the value of Error_min to the number of current errors.

Meanwhile, when three position detection patterns are not found in step 1604, the processing also moves to step 1611 through the NO branch.

In the following steps (steps 1611 to 1614), the aforementioned processing is repeatedly carried out while shifting the print position of the QR code S by S in both x and y directions within a search range up to X in the x direction and up to Y in the y direction. As a result of performing this processing on the image, a judgment is made in step 1615 as to whether or not Error_min<T. When it is judged in step 1615 that Error_min<T, the offset value providing the minimum value of errors is determined as the print position of the QR code (step 1617). When it is not judged that Error_min<T, the processing ends (step 1616).

In the foregoing processing, it is necessary to obtain the images for L and V and the mean values L and V of luminance values every time the print position of the code is shifted by S in the x direction (or the y direction). However, the processing can be increased in speed by holding the images for L and V and the mean values L and V of luminance values before the shift by S, and by adding only the differences from those before the shift to the previous images for L and V and the previous mean values L and V of luminance values.

Hereinabove, the example of the algorithm for search in step 1504 shown in the flow chart in FIG. 20 has been described by referring to the flow chart in FIG. 21. Here, the description returns to FIG. 20. In step 1505, a judgment is made as to whether the position of the QR code satisfying a predetermined accuracy in invisible information extraction is successfully searched out in the search of step 1504. When the search is judged as a success in step 1505, the processing moves to step 1506 through the YES branch, and printing is performed in the code size Q at angle An and in the offset (x, y).

When the search is judged as a failure in step 1505, that is, when the search fails, the foregoing processing (steps 1507 to 1510) is repeatedly carried out while changing the QR code size and the rotation angle An, until the print position is searched out. When the print position is not searched out to the end even by performing the processing while changing the QR code size and the rotation angle An, the processing ends with the QR code regarded as non-printable (step 1511).

In the embodiment of the present invention, the editor specifies the scales of steps (QStep, AnStep) of the QR code size and the rotation angle An to be changed. For example, when high-speed processing is required, relatively large values may be specified for QStep and AnStep. In contrast, when reliable processing is required even by taking a long time, relatively small values may be specified for QStep and AnStep. Incidentally, if AnStep >=360 is specified, the rotation angle An does not change.

In the embodiment of the present invention, when Q is set to a certain length, the processing ends once the offset value (x, y) allowing error correction is found even in a single position. As a modified example, however, another algorithm can be employed with which the offset value providing the smallest number of errors is searched out while all the QR code sizes and rotation angles An are examined.

According to the present invention, it is easily understood that print data capable of enhancing accuracy in extraction of invisible information to be printed on a physical medium together with visible information can be generated.

Although the present invention has been described hereinabove by using the embodiment of the present invention, the technical scope of the present invention is not limited to the foregoing description in the embodiment. For example, each of the writer's computer 11, the editor's computer 12 and the web server 13 has been described as one unit. As a matter of course, however, a plurality of units can be provided as each of these components.

In addition, the present invention can be implemented by employing hardware, software or a combination of hardware and software. In the case of the implementation using a combination of hardware and software, a typical example is the implementation using a computer system including a certain program. In this case, the certain program is loaded to the computer system and then executed, so that the certain program causes the computer system to execute the processing according to the present invention. This program is composed of a group of instructions each of which can be expressed by an arbitrary language, code or expression. In accordance with such a group of instructions, the system can directly execute specific functions, or can execute the specific functions after either/both (1) converting the language, code or expression into another one, or/and (2) copying the instructions into another medium. As a matter of course, the scope of the present invention includes not only such a program itself, but also a program product including a medium in which such a program is stored. A program for implementing the functions of the present invention can be stored in an arbitrary computer readable medium such as a flexible disk, an MO, a CD-ROM, a DVD, a hard disk device, a ROM, an MRAM and a RAM. In order to store the program in a computer readable medium, the program can be downloaded from another computer system connected to the system via a communication line, or can be copied from another medium. Moreover, the program can be compressed to be stored in a single storage medium, or be divided into more than one piece to be stored in more than one storage medium.

Use of this method eliminates the necessity of figuring out parameters through experiments and the like, and of inputting these parameters as numerical values. In addition, since this method uses a physical medium and inks which are to be actually used, as they are, their optical characteristics, an influence of a blue component of light emitted from an ultraviolet LED, and the like can be inputted all together as a picked-up image. Accordingly, the use of this method makes it possible to input parameters capable of accurately reproducing actual printed conditions, and thereby to produce printed materials providing high reading accuracy.

It is obvious to those skilled in the art that various modifications or improvements can be added to the foregoing embodiment. Accordingly, an embodiment to which such modifications or improvements are added is obviously included in the technical scope of the present invention.

That which is claimed is:

1. A method for obtaining parameters, comprising the steps of:
    irradiating with invisible light to which an invisible ink reacts a sample print obtained by printing on a physical medium invisible information to be extracted by a device having an image-pickup function, together with visible information, including at least four patterns capable of being distinctly extracted as different patterns, of (1) the physical medium itself, (2) at least one color of visible ink printed on the physical medium, (3) at least one color of the invisible ink printed on the physical medium, and (4) the invisible ink overprinted on the visible ink printed on the physical medium;
    picking up an image of the sample print in an irradiated state;
    obtaining (1) color data on a physical medium itself, (2) color data on at least one color of visible ink printed on the physical medium; (3) color data on at least one color of invisible ink printed on the physical medium; and (4) color data on the invisible ink overprinted on the visible ink printed on the physical medium;
    computing accuracy in invisible information extraction by using the color data on the physical medium itself, color data on the at least one color of visible ink printed on the physical medium, color data on the at least one color of invisible ink printed on the physical medium, and color data on the invisible ink overprinted on the visible ink printed on the physical medium, the visible information layout data and the invisible information layout data; and
    generating data for displaying information from the invisible information layout data when the accuracy satisfies a predetermined condition.

2. The method for obtaining parameters according to claim 1, further comprising identifying the physical medium by using identification before starting the obtaining operation.

3. The method for obtaining parameters according to claim 1, wherein four color inks of cyan, magenta, yellow and black as the visible ink are arranged as patterns distinguishable by color.

4. A parameter obtaining device comprising:
    a sample print obtained by printing on a physical medium invisible information to be extracted by a device having an image-pickup function, together with visible information, comprising at least four patterns capable of being distinctly extracted as different patterns, of (1) the physical medium, itself, (2) at least one color of visible ink printed on the physical medium, (3) at least one color of invisible ink printed on the physical medium, and (4) the invisible ink overprinted on the visible ink printed on the physical medium;

a reader for irradiating the sample print with invisible light to which the invisible ink reacts;

a sensor for picking up an image of the sample print in an irradiated state;

a processor for obtaining (1) color data on a physical medium itself, (2) color data on at least one color of visible ink printed on the physical medium; (3) color data on at least one color of invisible ink printed on the physical medium; and (4) color data on the invisible ink overprinted on the visible ink printed on the physical medium;

computing accuracy in invisible information extraction by using the color data on the physical medium itself, color data on the at least one color of visible ink printed on the physical medium, color data on the at least one color of invisible ink printed on the physical medium, and color data on the invisible ink overprinted on the visible ink printed on the physical medium, the visible information layout data and the invisible information layout data; and generating data for displaying information from the invisible information layout data when the accuracy satisfies a predetermined condition.

5. The parameter obtaining device according to claim 4, further comprising an identification unit for identifying the physical medium.

6. The parameter obtaining device according to claim 4, further comprising a storing unit for storing the color data on the physical medium itself, color data on the at least one color of visible ink printed on the physical medium, color data on the at least one color of invisible ink printed on the physical medium, and color data on the invisible ink overprinted on the visible ink printed on the physical medium.

7. A method for generating data for printing on a physical medium invisible information to be extracted by a device having an image-pickup function, together with visible information, comprising the steps of:

reading layout data for the visible information to be printed on the physical medium, from a storage section;

reading layout data for the invisible information from a storage section;

reading, from a storage section, color data on the physical medium itself, color data on the at least one color of visible ink printed on the physical medium, color data on the at least one color of invisible ink printed on the physical medium, and color data on the invisible ink overprinted on the visible ink printed on the physical medium;

computing accuracy in invisible information extraction by using the color data on the physical medium itself, color data on the at least one color of visible ink printed on the physical medium, color data on the at least one color of invisible ink printed on the physical medium, and color data on the invisible ink overprinted on the visible ink printed on the physical medium, the visible information layout data and the invisible information layout data; and determining whether the accuracy in invisible information extraction satisfies a predetermined condition; and generating data for printing invisible information from the invisible information layout data when the extraction accuracy satisfies the predetermined condition.

8. A system for generating data for printing, on a physical medium, invisible information to be extracted by a device having an image-pickup function, together with visible information, comprising:

means for storing layout data for the visible information to be printed on the physical medium;

means for storing layout data for the invisible information;

means for storing (1) color data on a physical medium itself, (2) color data on at least one color of visible ink printed on the physical medium; (3) color data on at least one color of invisible ink printed on the physical medium; and (4) color data on the invisible ink overprinted on the visible ink printed on the physical medium;

means for reading the color data (1), (2), (3) and (4), the visible information layout data and the invisible information layout data, and for computing accuracy in invisible information extraction;

means for judging whether the accuracy in invisible information extraction satisfies a predetermined condition; and means for generating data for printing invisible information from the invisible information layout data when the extraction accuracy satisfies the predetermined condition.

9. The system according to claim 8, further comprising:

means for irradiating the physical medium with invisible light to which the invisible ink reacts, in order to obtain the color data (1), (2), (3) and (4);

means for picking up an image of a sample print in an irradiated state.

10. The system according to claim 8, further comprising:

means for generating modified invisible information layout data when the extraction accuracy does not satisfy the predetermined condition; and wherein the computing means and the judging means processes the modified invisible information layout data.

11. The system according to claim 8, further comprising:

means for transmitting a feedback related to the layout data, to the means for generating modified invisible information layout data when the extraction accuracy does not satisfy the predetermined condition; and wherein the means for generating modified invisible information layout data includes means for optimizing the invisible information layout data according to the feedback in order to generate the modified invisible information layout data.

12. The system according to claim 11, wherein the optimizing means change the position of the layout data.

13. The system according to claim 11, wherein the layout data includes an image pattern representing all or a part of the invisible information.

14. The system according to claim 13, wherein the image pattern is a two-dimensional barcode representing the invisible information.

15. The system according to claim 8, comprising a printer for printing the invisible information according to data for printing the invisible information.

16. The system according to claim 8, further comprising a server including:

means for storing information related to the visible information in association with a specific address location;

means for receiving a request containing information representing the specific address location, from a device for extracting invisible information; and means for transmitting the information related to the visible information, to the device for extracting invisible information, in response to the request.

17. The system according to claim 16, further comprising an apparatus including:

means for uploading to the server the information related to the visible information;

means for transmitting the visible information; and means for transmitting the specific address location associated with the visible information uploaded to the server.

18. A computer program product embodied on non-transitory computer-readable memory for generating data for printing on a physical medium invisible information to be extracted by a device having an image-pickup function, together with visible information, the computer program product comprising computer program code for:

reading layout data for the visible information to be printed on the physical medium, from a storage section;

reading layout data for the invisible information from a storage section;

reading, from a storage section, color data on the physical medium itself, color data on the at least one color of visible ink printed on the physical medium, color data on the at least one color of invisible ink printed on the physical medium, and color data on the invisible ink overprinted on the visible ink printed on the physical medium;

computing accuracy in invisible information extraction by using the color data on the physical medium itself, color data on the at least one color of visible ink printed on the physical medium, color data on the at least one color of invisible ink printed on the physical medium, and color data on the invisible ink overprinted on the visible ink printed on the physical medium, the visible information layout data and the invisible information layout data; and determining whether the accuracy in invisible information extraction satisfies a predetermined condition; and generating data for printing invisible information from the invisible information layout data when the extraction accuracy satisfies the predetermined condition.

* * * * *